Figure 4:
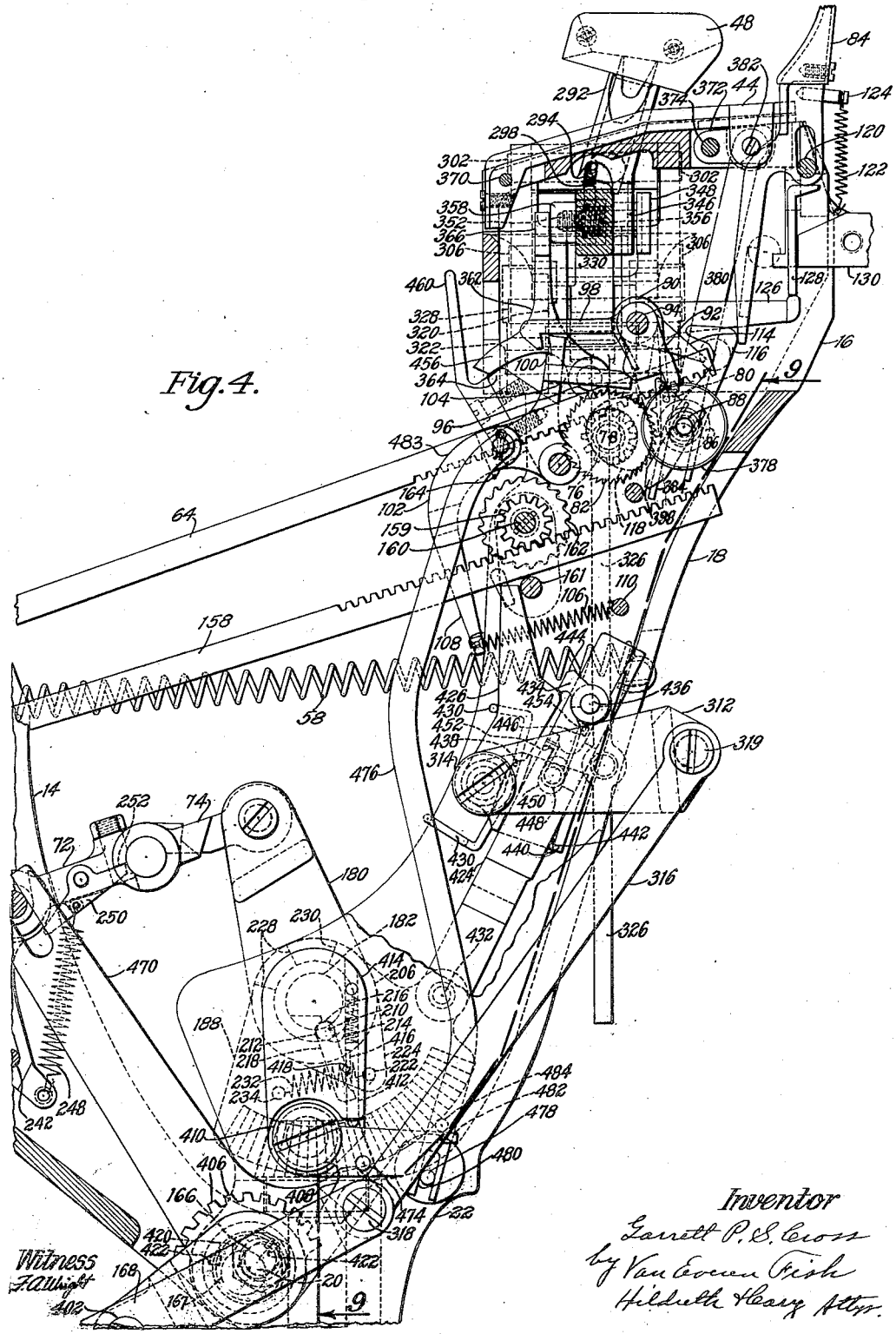

Oct. 6, 1936.        G. P. S. CROSS        2,056,713
SHOE SUPPORTING JACK
Original Filed Jan. 2, 1932    13 Sheets-Sheet 1
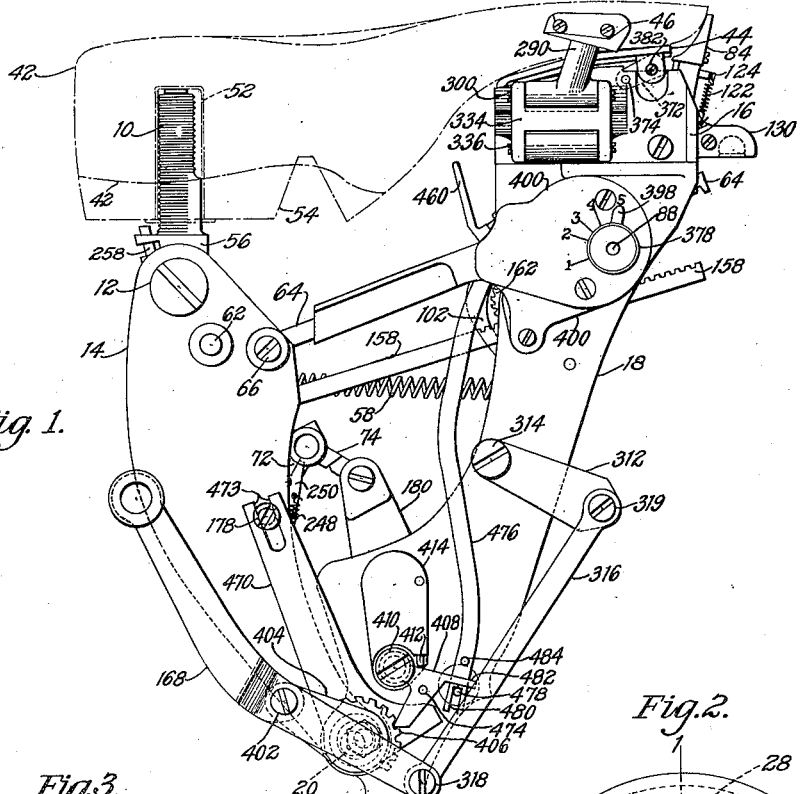
Witness
Frank A. Wright
Inventor
Garrett P. S. Cross
by Van Everen Fish
Hildreth Henry Attys Oct. 6, 1936.  G. P. S. CROSS  2,056,713
SHOE SUPPORTING JACK
Original Filed Jan. 2, 1932  13 Sheets-Sheet 2

Inventor
Garrett P. S. Cross
by Van Everen Fish
Hildreth & Cary Attys.

Witness
F. A. Wright

Oct. 6, 1936. G. P. S. CROSS 2,056,713
SHOE SUPPORTING JACK
Original Filed Jan. 2, 1932 13 Sheets-Sheet 3

Inventor
Garrett P. S. Cross
by Van Everen Fish
Hildreth Heavy Atty.

Witness
Frank A. Wright

Oct. 6, 1936.  G. P. S. CROSS  2,056,713
SHOE SUPPORTING JACK
Original Filed Jan. 2, 1932  13 Sheets-Sheet 4

Oct. 6, 1936. G. P. S. CROSS 2,056,713
SHOE SUPPORTING JACK
Original Filed Jan. 2, 1932 13 Sheets-Sheet 6

Witness
Frank A. Wright

Inventor
Garrett P. S. Cross
by Van Everen Fish
Hildreth Heary Atty.

Oct. 6, 1936.    G. P. S. CROSS    2,056,713
SHOE SUPPORTING JACK
Original Filed Jan. 2, 1932    13 Sheets-Sheet 7

Witness
Frank A. Wright

Inventor
Garnett P. S. Cross

Oct. 6, 1936.  G. P. S. CROSS  2,056,713
SHOE SUPPORTING JACK
Original Filed Jan. 2, 1932  13 Sheets-Sheet 8
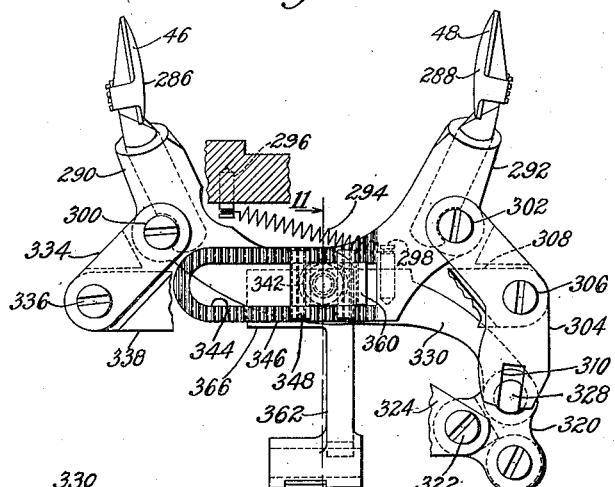
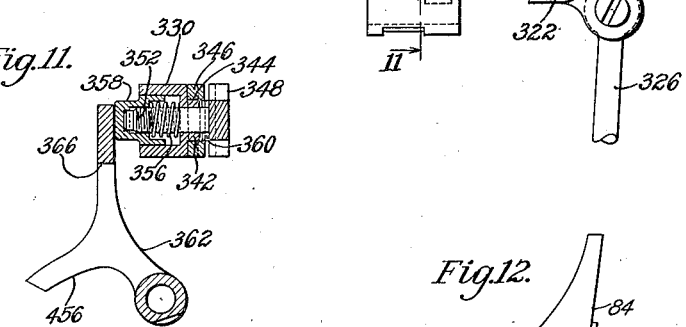
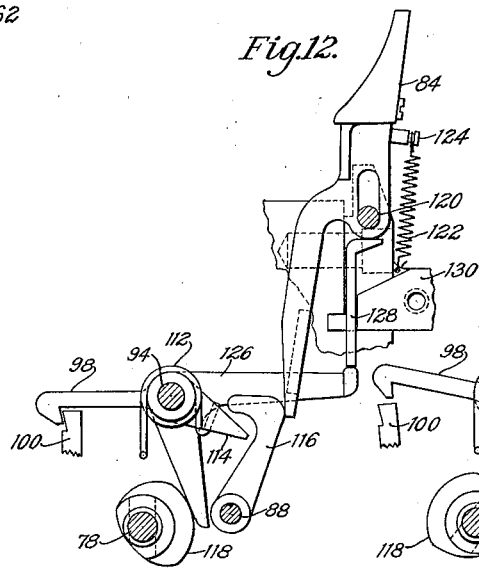
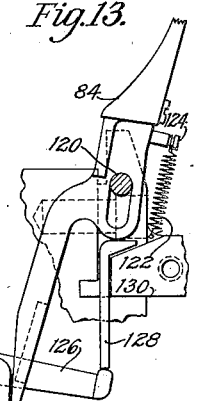
Witness
Frank A. Wright
Inventor
Garrett P. S. Cross
by Van Everen Fish
Hildreth Hay Attys Oct. 6, 1936.                G. P. S. CROSS                2,056,713
                          SHOE SUPPORTING JACK
              Original Filed Jan. 2, 1932    13 Sheets-Sheet 9
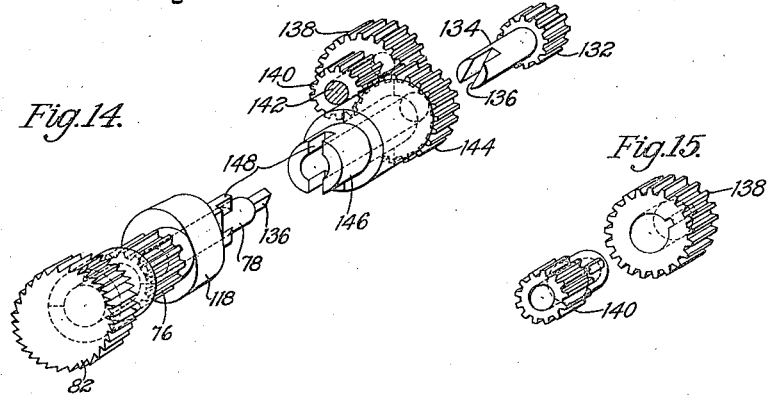
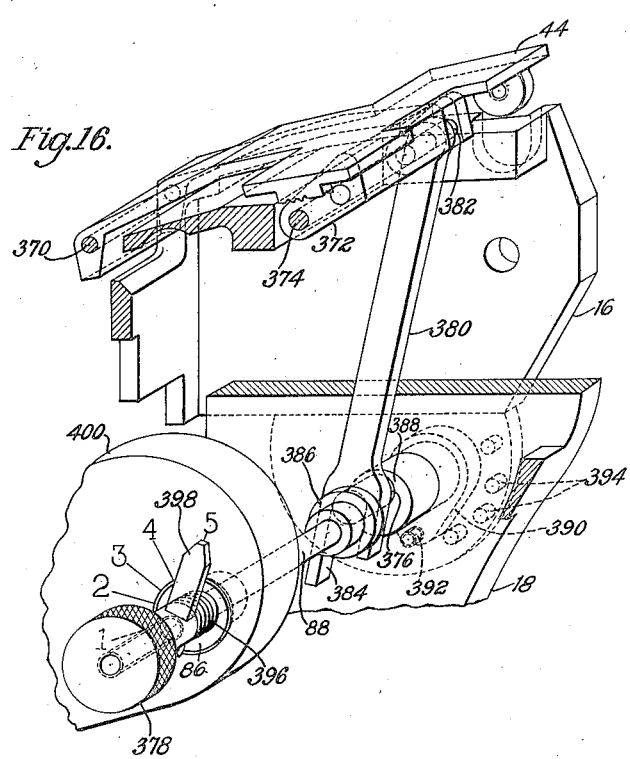
Witness
Frank A. Wright
Inventor
Garrett P. S. Cross
by Van Everen Fish
Hildreth Heavy Attys Oct. 6, 1936.  G. P. S. CROSS  2,056,713
SHOE SUPPORTING JACK
Original Filed Jan. 2, 1932  13 Sheets-Sheet 10

Oct. 6, 1936.   G. P. S. CROSS   2,056,713
SHOE SUPPORTING JACK
Original Filed Jan. 2, 1932   13 Sheets-Sheet 11

Witness
Frank A. Wright

Inventor
Garrett P. S. Cross
by Van Everen Fish
Hildreth & Hary Attys.

Oct. 6, 1936.  G. P. S. CROSS  2,056,713
SHOE SUPPORTING JACK
Original Filed Jan. 2, 1932   13 Sheets-Sheet 12

Witness
Frank A. Wright

Inventor
Garrett P. S. Cross
by Van Everen Fish
Hildreth Hery Attys.

Oct. 6, 1936.    G. P. S. CROSS    2,056,713
SHOE SUPPORTING JACK
Original Filed Jan. 2, 1932    13 Sheets-Sheet 13
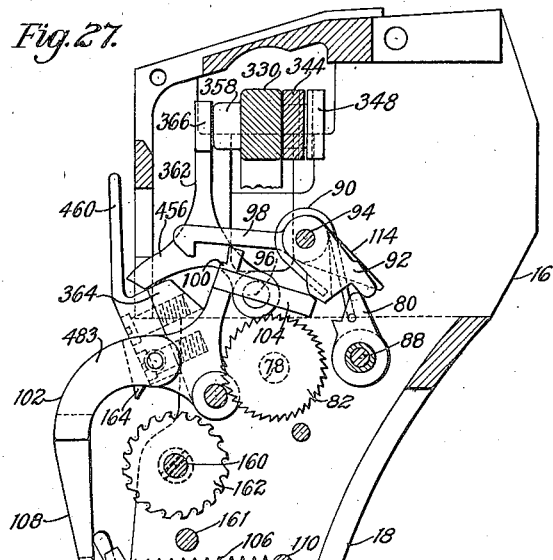
Fig. 27.
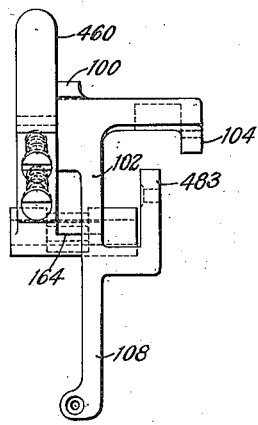
Fig. 32.
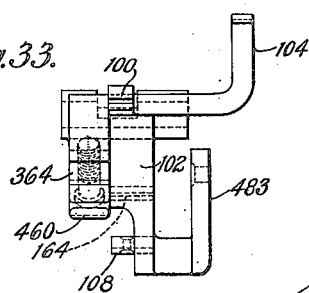
Fig. 33.
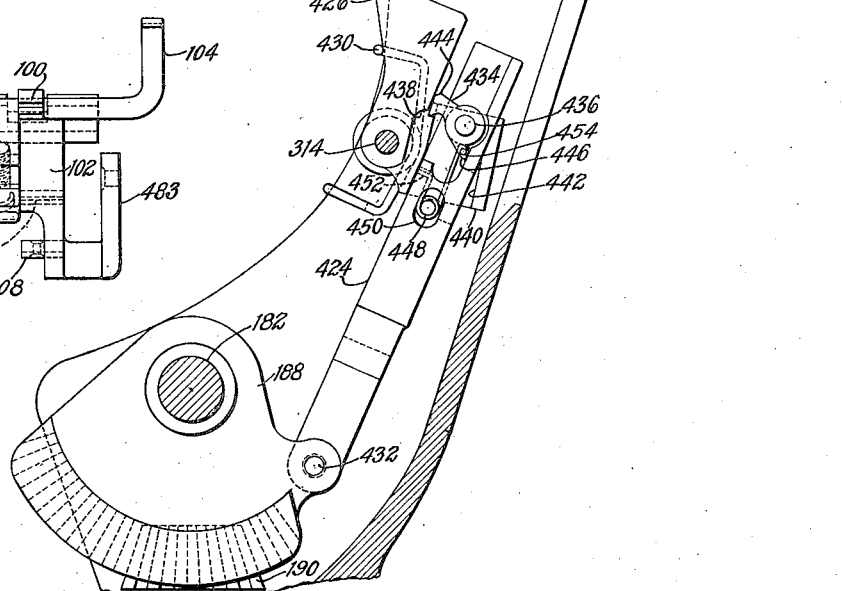

Patented Oct. 6, 1936

2,056,713

UNITED STATES PATENT OFFICE 2,056,713

SHOE SUPPORTING JACK

Garrett P. S. Cross, Beverly, Mass., assignor to United Shoe Machinery Corporation, Paterson, N. J., a corporation of New Jersey Application January 2, 1932, Serial No. 584,325
Renewed September 27, 1935

68 Claims. (Cl. 12—127)

The present invention relates to shoe supporting jack mechanisms and particularly to improvements in jack mechanisms, such as that illustrated and described in the patent to Topham No. 1,616,718 dated February 8, 1927. Such jack mechanisms are mounted in machines for operating on shoes of the type in which the shoe and the means for operating thereon are moved relatively to transfer the point of operation about the shoe and to change the relative positions of the shoe and the operating means to present the shoe properly to the operating means as the point of operation is transferred about the shoe.

Such jack mechanisms consist of a movable heel supporting jacking member on which a lasted shoe is mounted, and a stationary jacking member adapted to receive the toe portion of a lasted shoe and to cooperate with the movable jacking member to hold the shoe securely in jacked position. The jacking members are held separated or in open position when no shoe is mounted in the jack by means of a toggle. The placing of a lasted shoe upon the heel supporting member of the jack breaks the toggle, thereby permitting the jack to close upon the shoe.

The jack closing means of the Topham patent consists of a spring, one end of which is attached to the stationary jacking member and the other end of which is attached to the movable jacking member. This spring preferably should be light enough to permit the jack to be opened by hand, in order to remove a shoe therefrom before or during the operation thereon. It has been found that the heaviest spring that will permit easy manual manipulation is not heavy enough to hold the shoe in a fixed position on the jack, particularly during operations on the edge of the shoe when there is more or less lateral stress against the shoe. In order to obviate this disadvantage, the present invention provides a novel jack locking means for locking a lasted shoe securely in jacked position. Incidentally, the use of jack locking means makes possible the use of a jack closing spring substantially lighter than that of the Topham jack and the elimination of a dash pot mechanism adopted by Topham to control the closing movement of the jack.

An important feature of the invention consists of a novel means for holding the toe portion of the shoe against lateral movement of the jack. In the Topham jack, the toe receiving member consists of a concave surface which is designed to receive shoes of all sizes and styles, the toe of the shoe having a downward pressure applied thereto in the jacking of the shoe, in order to secure the toe of the shoe against lateral movement upon the jack. It has been found, however, that the shoe is not always securely held from lateral movement during operations on the edge of the shoe when there is more or less lateral stress against the shoe. In order to overcome this disadvantage, a feature of the present invention contemplates the provision of a novel means for securing the toe of the shoe against lateral movement upon the jack. This means in the embodiment hereinafter specifically described, consists of a pair of toe grips pivotally mounted at the upper extremity of the stationary jacking member, adapted to be moved in unison toward and from each other and normally held from shoe engaging position. Preferably, the toe grips are arranged to bear upon a sufficient extent of surface to securely hold the shoe, while leaving sufficient clearance for work positioning and operating devices. In order that the toe grips may accommodate themselves to different sizes of shoes, they are preferably arranged to be moved toward each other along downwardly inclining paths, so as to provide the desired vertical adjustment and are mounted to swivel about axes at an angle to the horizontal.

In order to position different styles of shoes in the proper vertical position for engagement by the toe pads, a feature of the invention contemplates the provision of a support for the toe portion of the shoe which is adjustable vertically in order to compensate for varying shapes of toes. In the illustrated embodiment of this feature, hand operated means are provided for adjusting the toe support, and in order to show clearly the various positions of the horizontal support and to provide a convenient means for its readjustment into a predetermined position, a scale and pointer are provided for indicating its various vertical positions.

In the Topham jack, the closing movement of the jack is arrested by mechanism actuated by a feeler mounted in the stationary jacking member and adapted to be tripped through engagement by the toe of the shoe. In the Topham jack, this feeler is located in a fixed vertical position relatively to the stationary jacking member. While such fixed position of the feeler is satisfactory for most shoes, large sizes of shoes fail to meet the feeler squarely and consequently tend to override it more or less. Such over-riding not only misplaces the shoe upon the jack, but also marks the toe cap, thereby reducing the merchantability of the shoe. In order to correct this condition, a feature of the present invention contemplates the provision of a novel means for vertical adjustment of said feeler, in order to insure a positive and definite engagement between the feeler and the toe of the shoe. The mechanism for adjusting the feeler is actuated by the closing movement of the jack, said feeler being carried downwardly as the jack closes, whereby it will be at the lower extremity of its vertical movement when the smallest sized shoe is mounted in the jack and at the upper extremity of its vertical movement when the largest size shoe is mounted in the jack.

In the Topham device, the jack rotates approximately 180 degrees in one direction in order to present the shoe to the operating means and transfer the point of operation about the shoe. This may conveniently be termed the operative rotation of the jack. In order to return the jack to its original position, the jack is rotated approximately 180 degrees in the reverse direction. For convenience, this will be referred to, hereinafter, as the reverse rotation of the jack. As has been stated, the jack is held open when no shoe is mounted therein by mechanism in the form of a pair of toggle links. The mounting of a lasted shoe upon the jack breaks the alinement of the toggle links, permitting the jack to close. It is, therefore, obvious that at the beginning of the operative rotation of the jack, the toggle is broken. During the operative rotation of the jack, the toggle links are automatically alined and during the reverse rotation of the jack, force is applied through the toggle links to return the jack to its open position. This action of the jack actuating mechanism limits the reverse rotation of the jack. A feature of the present invention in connection with this mechanism consists of novel means for enabling the jack to continue its reverse rotation after the jack is fully open and the movable heel supporting member has been brought up against a fixed stop and is thereby held against further movement. This means consists of an unlocking device for automatically disengaging the jack opening mechanism from its actuating means when the movable jacking member comes to the limit of its opening movement.

As has been stated, the present invention provides means for locking a lasted shoe in jacked position. It is apparent that the jack locking means must be released before the jack can be opened and that the release of the locking devices should take place during the reverse rotation of the jack and before the jack opening means operates. The jack opening means is therefore timed so as to provide sufficient time for the release of the jack locking mechanism, and a lever is provided for releasing said locking means, which lever is moved by devices actuated by the rotative movement of the jack.

It is sometimes desirable to unlock the jack in order to remove a jacked shoe therefrom prior to or during an operation thereon. For this purpose, a hand operated member is provided, which member is secured to a part of the locking mechanism and projects outwardly therefrom into a convenient position for actuation by the operator. A slight movement of this member by the hand of the operator releases the locking mechanism thereby permitting manual opening of the jack.

In order to protect the locking mechanism against actuation by accidental or inadvertent contact with the feeler lever so as to prevent closing of the jack, a guard is provided having a link connection with the jack locking mechanism whereby the guard is maintained in operative position while the jack is open and moved into inoperative position as the jack closes.

In the present embodiment of the invention, the jack locking mechanism consists of a lock rack pivotally mounted in the movable jacking member and positioned to engage a pinion in the stationary jacking member. The pinion has a ratchet arranged to rotate therewith, which ratchet is engaged by a pawl in order to secure the jack against opening movement. When the pawl is brought into engagement with the ratchet, without special provision being made there would be more or less play between the pawl and the nearest ratchet tooth. A further feature of the invention, in connection with this mechanism, therefore, consists of means for taking up the play between the pawl and the ratchet in order to secure the jacking members against the slightest opening movement. In the present embodiment of the invention, the means for taking up the play between the pawl and the ratchet consists of devices mounted on the movable jacking member for drawing the locking rack toward the movable jacking member, which devices are adapted to be actuated by a tilting movement of the last pin. Such tilting movement is imparted to the last pin by a downward movement of the movable jacking member, thereby lowering the heel portion of the jacked shoe and causing the shoe to turn about the toe rest.

A feature of the invention consists in a manually operated mechanism for successively positioning the shoe laterally of the jack, securing the jack in jacked position by taking up the play between the pawl and ratchet above referred to, and clamping the shoe in the jack. In the present embodiment of the invention this threefold manual operation is accomplished by a single movement of a hand jacking lever so mounted that the operator may impart a clamping strain to the clamping parts sufficient to clamp the shoe against the slightest movement in the jack.

Other features of the invention consist in novel constructions, combinations and arrangements of parts, hereinafter described and claimed, the advantages of which will be understood by those skilled in the art from the following description.

Figure 5:
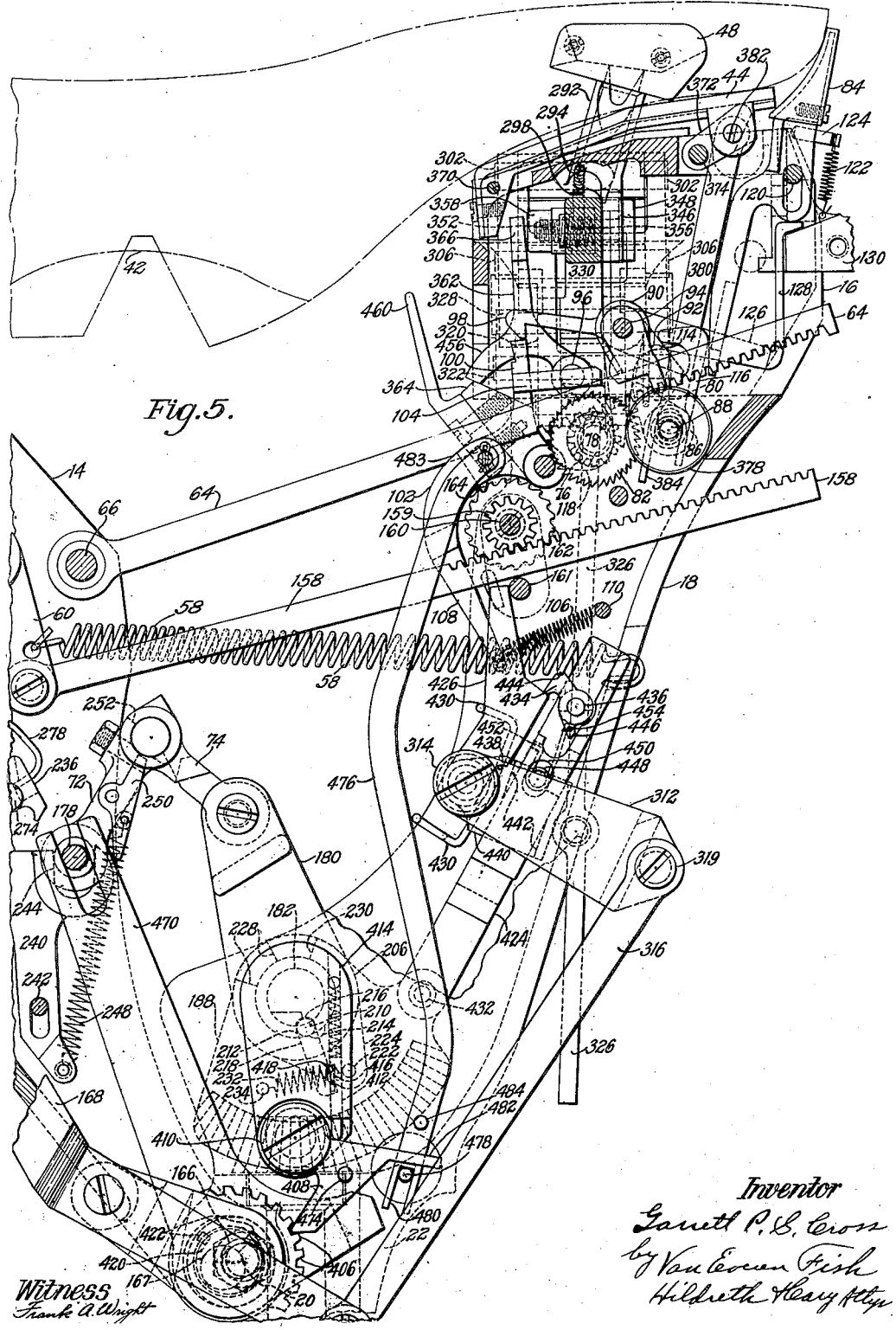
Figure 6:
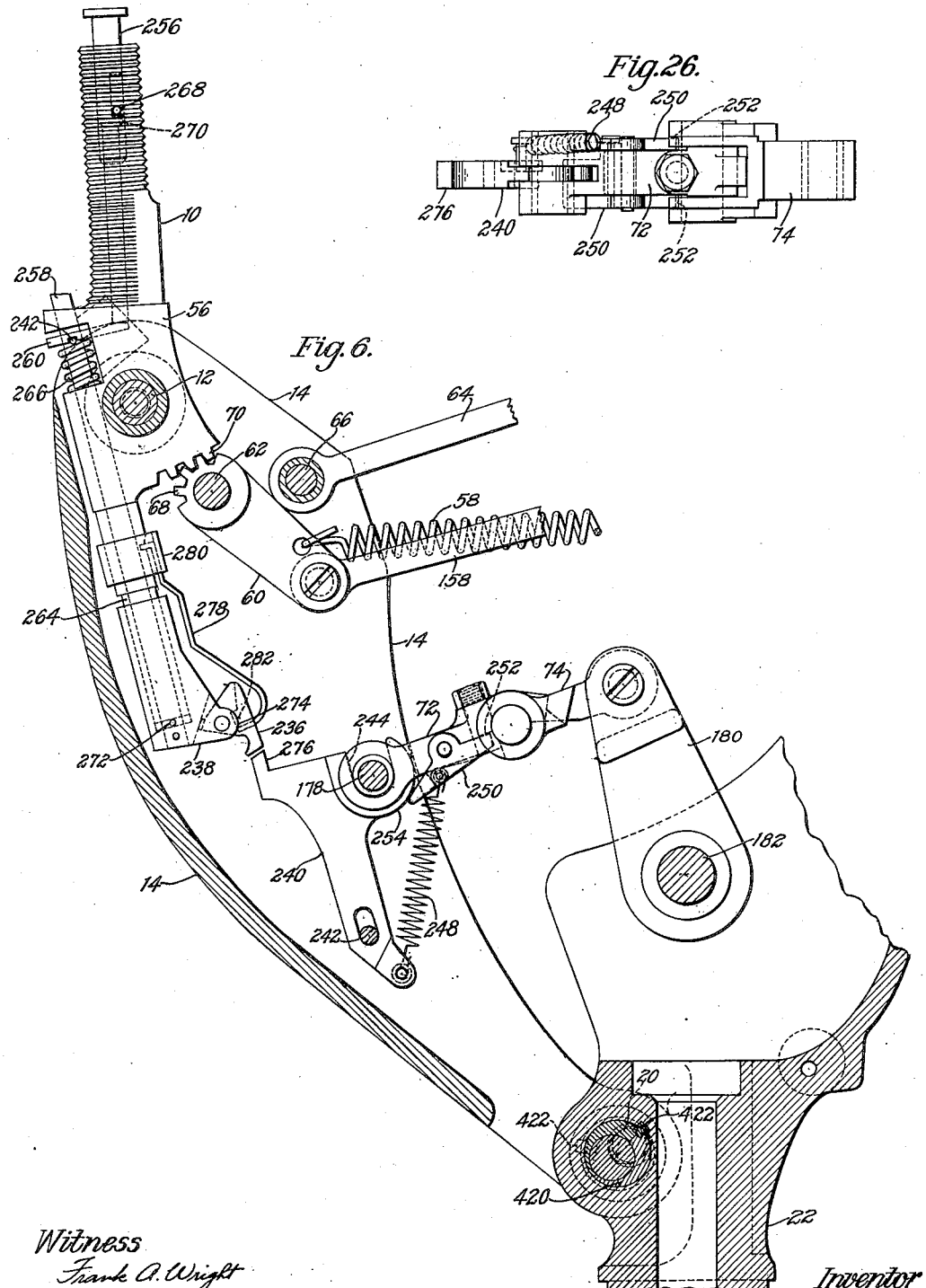
Figure 7:
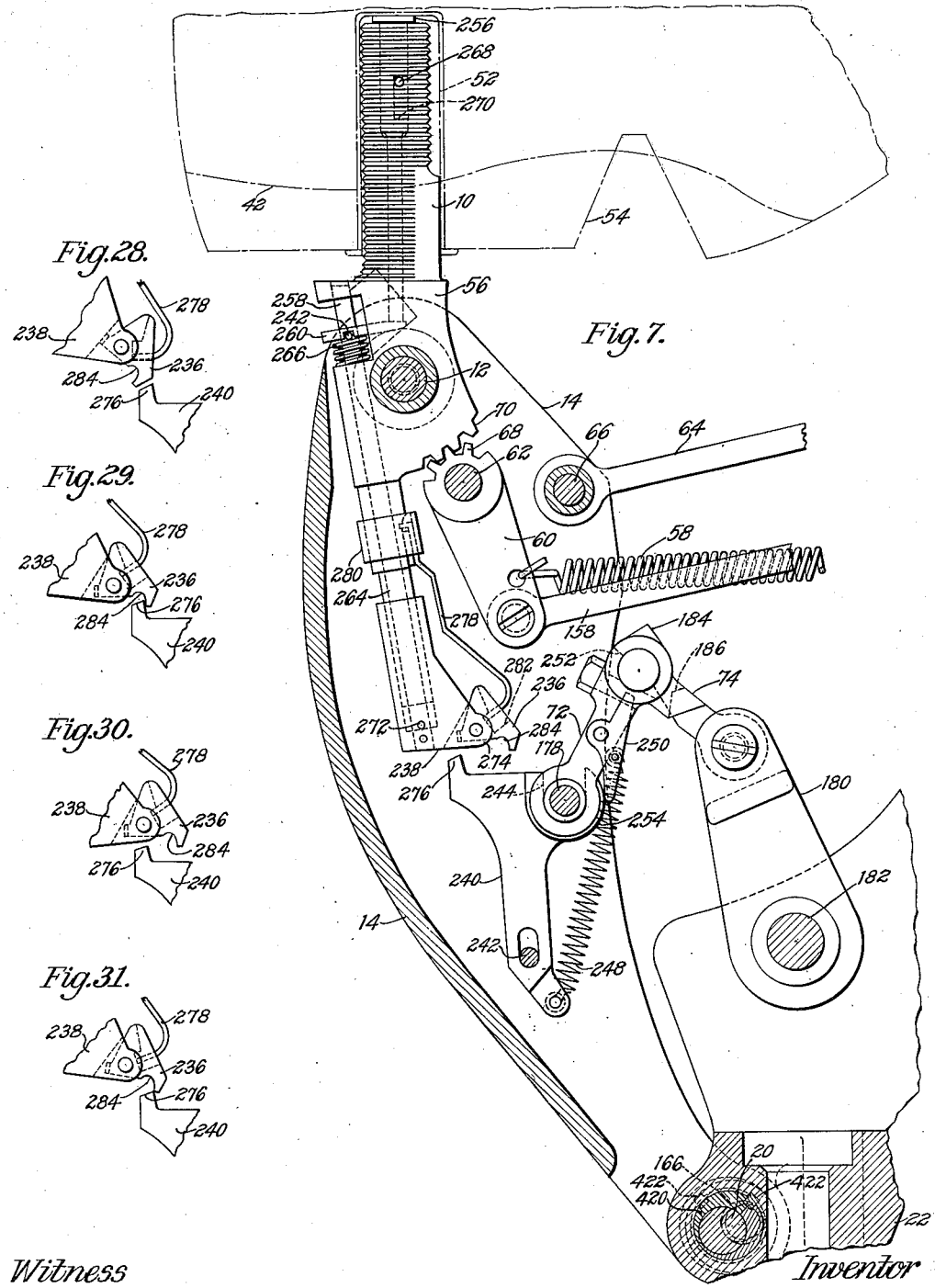
Figure 8:
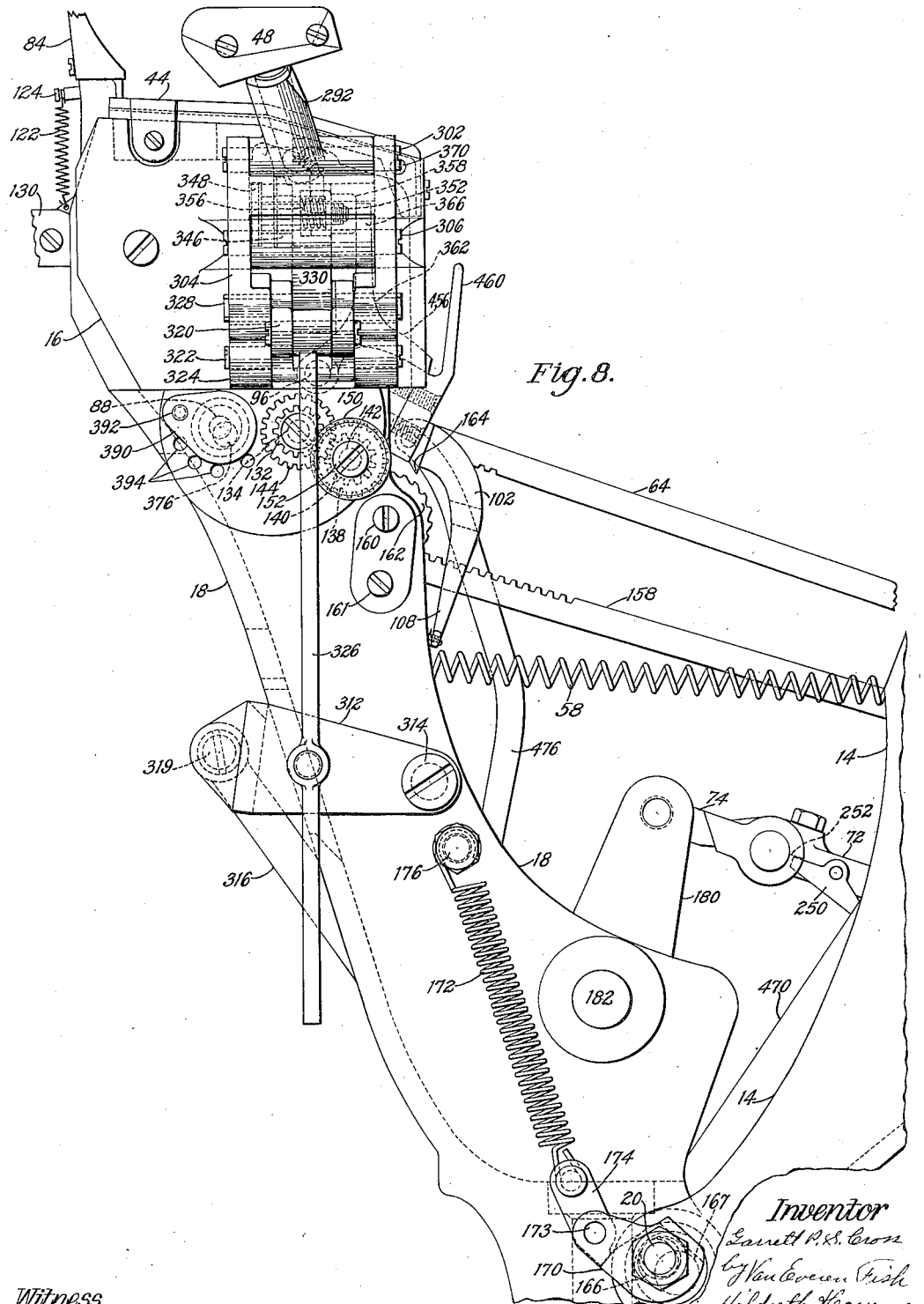
Figure 9:
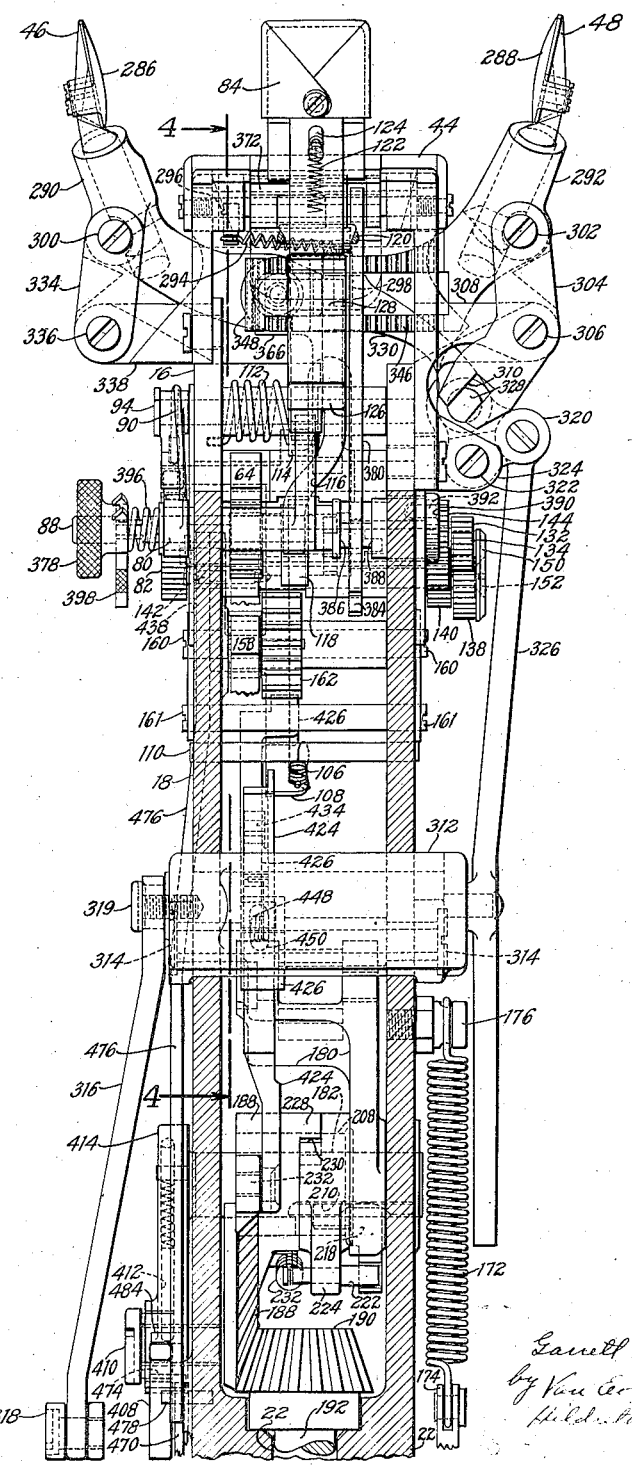
Figure 17:
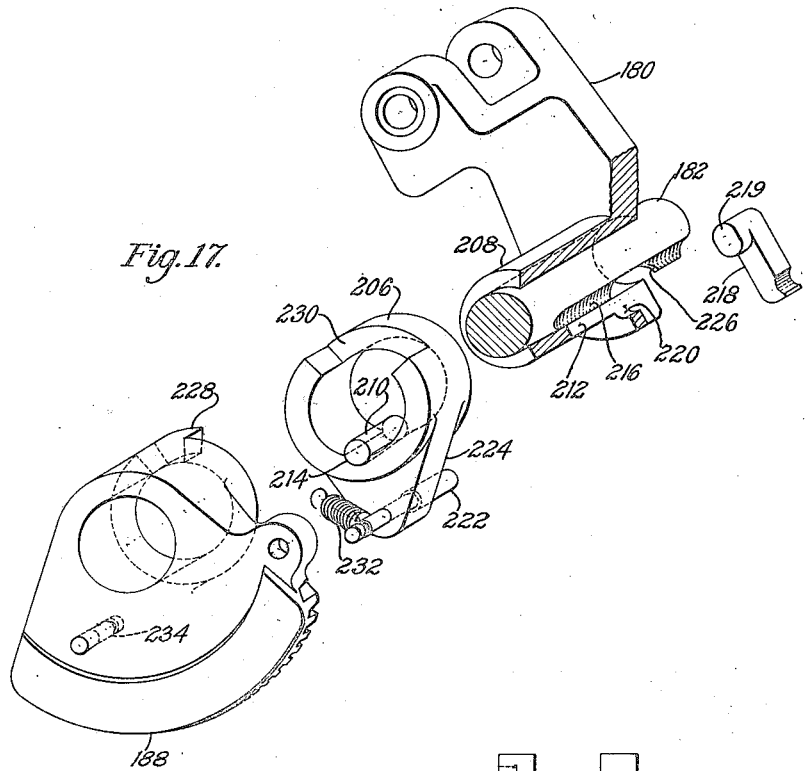
Figure 18:
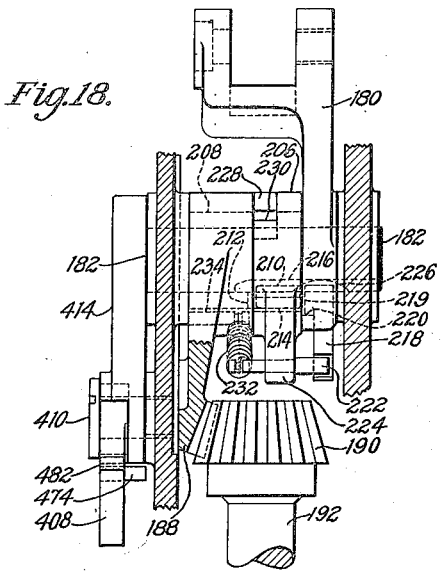
Figure 19:
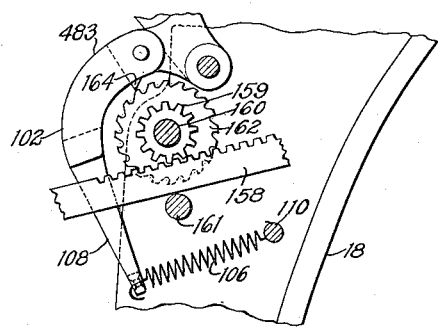
Figure 20:
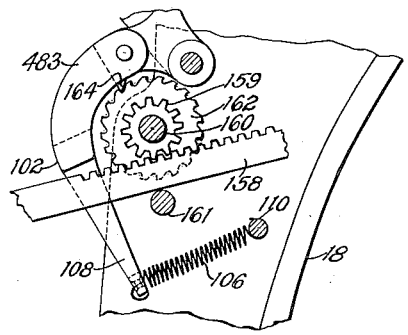
Figure 21:
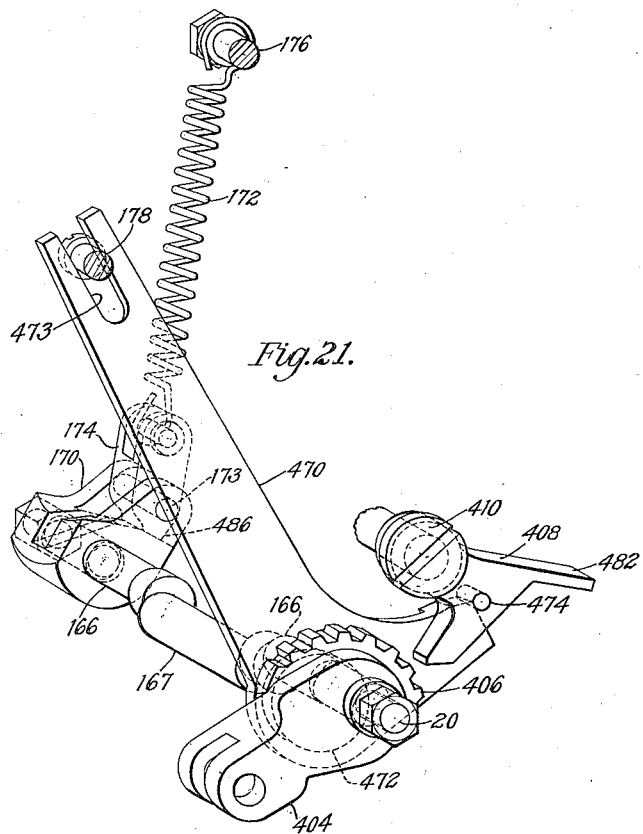

Referring to the drawings illustrating the invention in its preferred form, Fig. 1 is a view illustrating the jack in front elevation and the devices at the lower end of the jack spindle in section taken on the line 1—1 of Fig. 2; Fig. 2 is a detail sectional view illustrating the devices at the lower end of jack spindle taken substantially on the line 2—2 of Fig. 3; Fig. 3 is a sectional view taken substantially on the line 3—3 of Fig. 2; Fig. 4 is a front elevation of the stationary jacking member with the frame partly broken away and partly in section on the line 4—4 of Fig. 9, the jack being locked in open position; Fig. 5 is a similar view of the stationary jacking member, indicating a lasted shoe in jacked position therein; Fig. 6 is a vertical section of the movable jacking member and the means for locking the same in open position; Fig. 7 is a view similar to Fig. 6, illustrating the parts with a shoe in position on the movable jacking member; Fig. 8 is a rear elevation of the stationary jacking member; Fig. 9 is an end elevation of the stationary jacking member with the frame illustrated in partial section on the line 9—9 of Fig. 4; Fig. 10 is a view in elevation illustrating the movable toe grips and the parts associated therewith; Fig. 11 is a sectional elevation taken on the line 11—11 of Fig. 10, illustrating the means for locking the pivotally mounted toe grips in shoe engaging position; Figs. 12 and 13 illustrate the latch for holding the jack locking devices out of locking position together with the latch actuating means; Fig. 14 is a perspective view of the reduction gearing for rotating the cam illustrated therein, the parts being separated for convenience of illustration; Fig. 15 is a perspective view of a portion of the reduction gearing illustrated in Fig. 14, the parts being separated; Fig. 16 is a perspective view partly in section of the horizontal toe supporting member and the means for vertical adjustment thereof; Fig. 17 is a perspective view of a portion of the mechanism for opening the jack, the parts being separated for convenience of illustration, and partly broken away to illustrate underlying parts; Fig. 18 is a side elevation of the mechanism illustrated in Fig. 17 with the parts assembled, and showing, in addition, the gear for actuating the same; Figs. 19 and 20 are detail views illustrating two positions of parts of the mechanism for locking the jack in jacked position; Fig. 21 is a perspective view of the eccentric shaft for supporting the movable jacking member, and the parts associated therewith; Figs. 22 to 25 inclusive, are views in front elevation of the mechanism illustrated in Fig. 18, showing the parts in their different relative positions at different rotative positions of the jack; Fig. 26 is a plan view of the toggle mechanism for locking the jack in open position; Fig. 27 is a view similar to Fig. 4, parts having been removed to illustrate more clearly the devices for releasing the mechanism for locking the jack in jacked position; Figs. 28 to 31 inclusive illustrate a portion of the toggle breaking mechanism in various operating positions; Fig. 32 is a detail view in elevation of a pawl lever of the jack; and Fig. 33 is a plan view of the pawl lever.

The jack, illustrated in the drawings, comprises a heel support in the form of a last pin 10 pivotally mounted at 12 upon a movable jacking member 14, and a toe rest 16 mounted upon a stationary jacking member 18. The movable jacking member 14 is pivotally mounted to swing about a shaft 20 journaled in the lower portion of the stationary jacking member 18 which latter member is rigid with and extends upwardly from a hollow spindle 22. The jack is carried by a support 24 which may be mounted for movement in substantially the same manner as the corresponding members of the machine illustrated and described in the above identified patent to Topham No. 1,616,718.

The lower end of the jack spindle has formed integrally therewith a hemispherical shell or casing 26 pivoted to swing upon bearing pins 28 (Figs. 1, 2 and 3) secured in a gimbal ring 30 and the pins having their inner ends engaging in bearings in the shell. The gimbal ring 30, in turn, is pivoted to swing upon bearing pins 32 mounted in the ring having their outer ends engaging in bearings in a jack supporting wheel 34. The common axis of the bearing pins 28 is preferably located substantially at right angles to the common axis of the bearing pins 32 so that the shell 26 and the jack spindle can swing in any direction about its connections on the wheel 34. The wheel 34 is mounted to rotate on a vertical hollow sleeve 36 which is secured by a clamp to the forward ends of the arms of the support 24, a ball bearing 38 being interposed between the sleeve 36 and the wheel 34 to reduce friction. This manner of mounting the wheel 34 enables the jack spindle to be rotated freely.

The jack spindle may have substantially the same movements imparted thereto as the jack spindle of the machine illustrated and described in the patent above referred to. As described in said patent the jack spindle is rotated through substantially half a rotation in the direction indicated by the arrow a, Fig. 1 during the operation on the shoe. After the completion of the operation on the shoe and the disengagement of the shoe from the operating means, the jack is rotated through substantially half a rotation in the direction indicated by the arrow b, Fig. 1, to return the jack to its starting position. These rotary movements of the jack are produced by rotating the wheel 34 by means of a cable 40 passing about the same.

As in the patent above referred to, the jack is constructed and arranged so that upon the placing of a lasted shoe, such as illustrated at 42, on the jack, the shoe is automatically located in a predetermined and unvarying position lengthwise of the jack regardless of its size, and at the completion of the operation on the shoe, the shoe is unclamped and the parts of the jack are returned to their initial positions ready for the application of another shoe to the jack. The shoe is gaged with relation to the jack from the forward point in the bulge in the toe portion of the upper. The toe rest, comprises a toe support plate 44 adjustable vertically to accommodate different styles of toes, and toe grips 46 and 48 (see Figs. 9 and 10) constructed and arranged to center the shoe relatively to the jack and hold it rigidly in adjusted position. The heel support consists of the last pin 10 (see Figs. 1 and 7) for insertion into the pin hole, indicated at 52, of the last 54, and is arranged to engage the bottom of the last pin hole in order to locate the heel portion of the shoe in proper vertical position. The last pin extends upwardly from a lever 56 having its pivot 12 carried at the upper end of the movable jacking member 14.

Before a lasted shoe is placed on the jack, the movable jacking member 14 is located in a position relatively remote from the stationary jacking member 18 (see Fig. 6) and upon the placing of the shoe upon the last pin 10 (see Fig. 7) the movable jacking member 14 is swung toward the stationary jacking member 18 to adjust the shoe in a proper position longitudinally of the jack. The movable jacking member is actuated by a coiled spring 58 secured at one end to the stationary jacking member and at the other end to a lever 60 pivoted upon a stud 62 carried at the upper end of the movable jacking member. The coiled spring 58 is of sufficient strength to hold the shoe in place on the jack but does not exert such a force as will prevent easy manual adjustment of the parts. The movement of the movable jacking member by the spring 58 is limited, as hereinafter described, by a stop rack 64 pivoted on a stud 66 fixed to the movable jacking member. Upon the hub of the lever 60 is formed a series of gear teeth 68 meshing with corresponding teeth 70 formed on the hub of the last pin lever 56. When a shoe is applied to the jack, the movable jacking member 14 is held at the limit of its movement away from the stationary jacking member by means of a toggle comprising a pair of toggle links 72 and 74, the coil spring 58 then being distended as illustrated in Fig. 4. On placing a shoe on the last pin, the toggle is broken and the movable jacking member 14 is thus released so that it is free to move under the action of the coiled spring 58 toward the stationary jacking member, thereby carrying the toe of the shoe into engagement with the toe support 44, and sliding the same along the toe support toward the forward end thereof. The surface of the toe support, with which the toe of the shoe is thus brought into contact, is inclined upwardly so that as the toe of the shoe slides along this surface, it is lifted thereby, swinging the last pin lever 56 about the pivot 12 and also swinging the lever 60 about the stud 62 in a direction to carry the lever 60 away from the hub of the stop rack 64 into the position illustrated by Fig. 7.

In order that the shoe may be located accurately in a predetermined and definite position longitudinally of the jack, mechanism is provided for arresting the swinging movement of the movable jacking member 14 toward the stationary jacking member when the forward point of the bulge in the toe portion of the upper reaches a predetermined position longitudinally of the jack. The mechanism for thus arresting the movement of the movable jacking member cooperates with the stop rack 64, which passes through an opening in the stationary jacking member, and comprises a pinion 76 meshed with the rack and secured to a shaft 78 journaled in the stationary jacking member (see Figs. 4, 5, and 27). The movement of the stop rack 64 is arrested by a pawl 80 arranged to engage a ratchet wheel 82 secured to the pinion shaft 78, by the actuation of a feeler lever 84 mounted on the toe rest of the jack. The pawl 80 is fulcrumed on a shaft 88 and is arranged to be yieldingly actuated by a hair pin spring 90 coiled about the hub of a dog 92 pivoted on a stud 94, one end of the spring being secured to the dog and the other end being positioned in a horizontal hole in the pawl. The tension of the spring 90 is such that as it tends to straighten itself a downward extension of the dog is forced into engagement with the upper end of the pawl 80. The hole in the pawl which receives the lower end of the spring 90, being spaced below the point of contact of the pawl with the extension on the dog, the tension of the spring causes the dog to swing the pawl 80 until the pawl engages the ratchet. In order to hold the stop rack 64 in engagement with the pinion 76, a stud 96 is provided to engage the upper surface of the stop rack, thus limiting the upward movement of the rack. When the movable jacking member is swung toward the stationary jacking member to adjust the shoe longitudinally of the jack, the ratchet wheel 82 is rotated in a clockwise direction, as viewed in Fig. 5, by the longitudinal movement of the stop rack 64, and the teeth of the ratchet wheel face in a direction such that the rotation of the wheel in a clockwise direction will be arrested when the pawl 80 is engaged therewith.

The pawl 80 is normally held out of engagement with the ratchet wheel 82 during the movement of the movable jacking member toward the stationary jacking member by means of a latch lever 98 and connections between the latch lever and the pawl. The latch lever 98 is pivotally mounted for convenience on the stud 94 which carries the dog 92 and is arranged to engage a vertical arm 100 of a pawl lever 102, a horizontal extension 104 of which engages an inclined surface on the dog 92, thereby holding the pawl 80 out of engagement with the ratchet 82. The pawl lever 102 is tensed in a counter-clockwise direction by a spring 106, one end of which is attached to a downwardly curved arm 108 of the pawl lever and the other end of which is attached to a stud 110 carried by the stationary jacking member. The latch 98 is yieldingly held in latching position by a spring 112 (see Fig. 12) passed around the hub of the latch, one end of the spring being hooked beneath a tail 114 of the latch and the other end being secured in the frame. The latch 98 is operated when the toe of a shoe comes into contact with the feeler lever 84 through a hook shaped arm 116 pivotally mounted upon the stud 88 and arranged to be actuated by the feeler lever and to engage and depress one end of the latch lever 98, thus rocking it about the stud 94.

In accordance with a feature of the invention, the feeler lever 84 is vertically adjustable in order to position it properly for engagement by different sizes of shoes. This adjustment is automatically effected by the movement of the movable jacking member toward the stationary jacking member in clamping the shoe. As illustrated in Figs. 12 and 13, the mechanism for adjusting the feeler lever comprises a cam 118, freely rotatable upon the shaft 78 and arranged to be actuated by rotation of the pinion 76 attached to the shaft, through reduction gearing, hereinafter described. The timing of the rotation of the cam 118 is such that it rotates less than a complete revolution during the jacking of the shoe, the degree of rotation depending upon the size of the shoe to be operated upon. The feeler lever 84 is mounted for vertical movement upon a supporting stud 120 passing through a slot in the lever and is moved downwardly along the slot by the tension of a coiled spring 122, one end of which is passed about a stud 124 extending outwardly from the feeler lever and the other end of which is attached to the frame of the stationary jacking member. Connections are provided between the cam 118 and the feeler lever comprising a bell-crank lever 126 pivotally mounted on the shaft 94 and so arranged that its downwardly extending vertical arm engages the cam 118 and its horizontal arm contacts a vertical sliding link 128, the upper end of which engages the bottom of the feeler lever. The link 128 is mounted within guiding surfaces formed in a bracket 130 on the jack. The extent of downward movement of the feeler lever, being controlled by the rotary cam 118, will be proportional to the extent of movement of the movable jacking member in jacking a shoe and, therefore, proportional to the size of shoe to be operated upon.

The reduction gearing for rotating the cam 118 to adjust the feeler lever vertically (see Fig. 14) comprises a gear 132 fixed to a shaft 134 in axial alignment with the pinion shaft 78 and having a tongue and groove connection 136 therewith, a gear 138 keyed to the hub portion of a smaller gear 140 (see Fig. 15) journaled on a stud screw 142 projecting from the frame of the stationary jacking member, the larger gear 138 meshing with gear 132 and the smaller gear 140, in turn, meshing with a gear 144 secured to a sleeve 146. The sleeve 146 rotates at one end upon the pinion shaft 78 and at the other end upon the shaft 134. Rotation is imparted to the cam 118 through a tongue and groove connection 148 between the sleeve 146 and the hub extending axially from the cam 118. The gear 132 is held in mesh with the gear 138 and the tongue and groove parts 136 are held in engagement by a disk 150 mounted on the end of the stud 142 by a screw 152, as shown in Figs. 8 and 9. During the jacking operation, the rack 64 rotates the pinion 76 fast on the shaft 78. This rotation is imparted by the shaft 134 to the pinion 132 which causes the gear 144 to be driven through the coupled gears 138 and 140. The sleeve 146, carrying the gear 144 is thus caused to rotate and the cam 118 for adjusting the feeler finger 84 is moved correspondingly through the tongue and groove connection 136.

In accordance with the features of the invention relating to locking the members of the jack in position, one end of the lever 60 in the movable jacking member is pivotally connected to one end of a lock rack 158 passing through an opening in the stationary jacking member. The rack 158 is arranged to mesh at its other end with a pinion 159 (see Figs. 4 and 5) secured to a shaft 160 journaled in the stationary jacking member, and is held in engagement therewith by a stud 161 fixed in the jack frame. In order to lock the rack 158 against movement, a ratchet wheel 162 is also secured to the shaft 160 and so arranged thereon that the ratchet teeth face in a direction such that movement of the rack 158 away from the stationary jacking member can be prevented by a detent portion 164 of the pawl lever 102, previously referred to. During the movement of the movable jacking member to jack a shoe, the ratchet wheel 162 is rotated in a counter-clockwise direction and, as the movement of the movable jacking member is arrested by the stop rack 64, the pawl lever 102 is released from inactive position by the feeler lever 84 through the connections above described, and the detent 164 of the pawl lever is brought into contact with the ratchet wheel 162 by the action of the spring 106.

In order to bring the ratchet wheel 162 into positive locking engagement with the detent 164 of the pawl lever 102 so that no lost motion is present, clockwise rotation is imparted to the ratchet wheel by mechanism which operates to swing the shoe slightly about the toe support, and through the connection between the shoe and the last pin operates to swing the last pin slightly in a counter-clockwise direction. The last pin, in turn, swings the lever 60 slightly in a clockwise direction and moves the lock rack 158 in a direction to impart the desired clockwise rotation to the ratchet wheel 162. For tilting the shoe about the toe support, the lower end of the movable jacking member is journaled upon the end eccentric portions 166 of the shaft 20 (see Figs. 4, 5, 7, and 21), which shaft is arranged to be actuated by a manual jacking lever 168 (see Fig. 1) to impart a downward movement to the movable jacking member. In order to hold the shaft 20 yieldingly in a position to support the movable jacking member at the limit of its upward movement, an arm 170 (see Fig. 21) is fixed to the shaft 20 and a coiled spring 172 connects a link 174, pivoted at 173 on the arm 170, with a stud 176 projecting from the stationary jacking member.

The movable jacking member is connected to the stationary member by a toggle of which the link 72 is pivotally connected to a shaft 178 on the movable jacking member and the link 74 is pivotally connected with the end of an arm 180 pivoted on a stud 182 fixed in the frame of the stationary member (see Fig. 6). The relative angular movement of the links of the toggle beyond the point in which the links are alined is limited by means of a projection 184 (see Fig. 7) of the link 72 arranged to engage an abutment or contact face 186 on the link 74. The arm 180 is arranged to be actuated by a bevel gear segment 188 rotating about the stud 182 and meshing with a bevel gear 190 (see Fig. 9) secured to the upper end of a shaft 192 mounted in bearings in the jack spindle 22. Upon the lower end of the shaft 192 is formed a yoke 194 (see Figs. 1, 2, and 3) which embraces a gimbal ring 196 and is pivotally connected with the ring by means of bearing pins 198 secured in the ring and engaging in bearings in the arms of the yoke. The ring 196 embraces a yoke 200 mounted on the upper end of a stud 202 passing through and keyed in the sleeve 36 and is pivotally connected with the yoke 200 by means of bearing pins 204 secured in the ring and engaged in bearings in the arms of the yoke. The shaft 192 through its connection with the sleeve 36 is held from rotary movement with the jack spindle but is free to swing in any direction relative to the stud 202 in accordance with the swinging movements of the spindle. When the jack is in readiness to receive a shoe, the toggle links 72 and 74 are in alinement and the toggle actuating arm 180 is held in position by the segment 188 which, in turn, is held in position by engagement with the stationary bevel gear 190, thereby maintaining the movable jacking member in a position remote from the stationary jacking member, as shown in Fig. 4, against the tension of the spring 58. The toggle is straightened during operation of the machine as the jack is turned through substantially one-half a revolution in the direction of the arrow "a" (Fig. 1), the gear segment 188 being swung on the stud 182 in a clockwise direction as viewed in Fig. 4, thereby swinging the arm 180 away from the movable jacking member until, at the completion of the operation on the shoe, the toggle is straightened. As the jack is turned in the opposite direction or in the direction of the arrow "b" (Fig. 1) through substantially one-half a revolution after the completion of the operation on the shoe, to bring the jack to its initial or starting position, the segment 188 is rotated in a counter-clockwise direction, as viewed in Fig. 4, swinging the toggle actuating arm 180 away from the stationary jacking member. The toggle links which are then in alined position cause the movable jacking member to be swung away from the stationary jacking member. The shoe is thus unclamped from the jack, and may be removed from the jack merely by lifting the shoe from the last pin 10.

Figure 22:
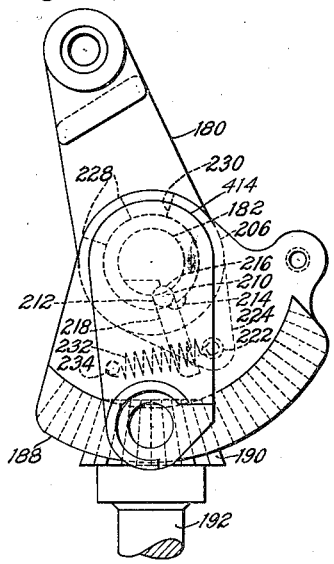
Figure 23:
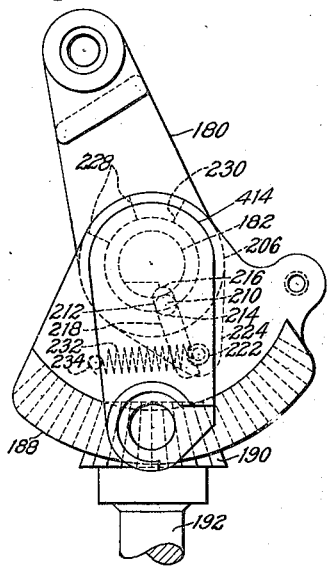

During certain operations on a shoe, as for instance, during the sewing of the seam along the shank of the shoe on the side of the shoe first sewn, the jack is first turned slightly in the direction of the arrow "b" (Fig. 1). In a machine arranged to operate the jack in this manner if the operator should inadvertently start the machine with no shoe secured on the jack while the toggle lever is straightened, the movement of the gear segment 188 would break certain of the parts if auxiliary devices were not provided to obviate this tendency. In the jack of the Topham patent this possibility has been obviated by auxiliary devices which operate to break the toggle. A feature of the present invention consists in means for guarding against breakage of the parts while maintaining the toggle in straightened condition and thus maintaining the jacking members always in position to receive a shoe. To this end, the gear segment 188 is constructed and arranged to be disconnected from the arm 180 if the jack is turned from its starting position in the direction of the arrow "b" (Fig. 1), with the toggle straightened. This result is effected by providing a separable connection between the gear segment 188 and the arm 180 comprising an intermediate member 206 (see Figs. 17 and 18) fulcrumed on an extending hub 208 of the arm 180 and arranged to be locked to the hub of said arm by a locking roll 210 positioned within a longitudinal slot 212 in the hub and arranged to engage selectively with a groove 214 formed in the intermediate member 206 and a groove 216 formed in the stud 182. The grooves 214 and 216 are so positioned relatively to the slot 212 that they are in alinement with the slot as the machine is started, as shown in Fig. 23. If the machine is started with the toggle links already in alinement, the edge of the groove 214 in the intermediate member operates as a cam surface to force the locking roll into engagement with the groove 216 in the stud 182 as indicated in Fig. 22. In this position the intermediate member 206 is unlocked from the arm 180 and is free to rotate idly upon the stud 182, and the arm 180 is locked to the stud 182, thus maintaining the position of the jacking members fixed. To insure the return of the locking roll into engagement with the groove 214 in the intermediate member when that groove is positioned to receive it, a block 218 is positioned within the slot 212 formed in the hub of the arm 180 and supported therein by the engagement of an enlarged portion 219 at one end of the block in an opening 220 formed in the arm. The block 218 is arranged to be engaged at its free end by a cross pin 222 extending from an arm 224 of the intermediate member 206, during the rotation of the jack in the direction of the arrow "a" in Fig. 1. The cross pin 222 and block 218 are so arranged that they come into engagement as the grooves 214 and 216 come into alinement with the slot 212. In this position, if the locking roll 210 fails to drop through the slot 212 into the groove 214, the cross pin 222 will actuate the arm 180 through the block 218, and the groove 216, which is stationary with the stud 182 will act as a cam surface to force the locking roll 210 through the slot 212 into the groove 214 in the intermediate member, thus locking the intermediate member to the hub 208 of the arm 180. The enlarged portion 219 on the block 218 extends within the hub 208 of the arm 180 and a clearance groove 226 for the enlarged portion is cut across the under surface of the stud 182. In order to limit the movement of the arm 180 in a direction to swing the movable jacking member away from the stationary jacking member, the groove 226 terminates in the groove 216 to adapt the groove 216 to arrest the movement of the block 218.

Figure 24:
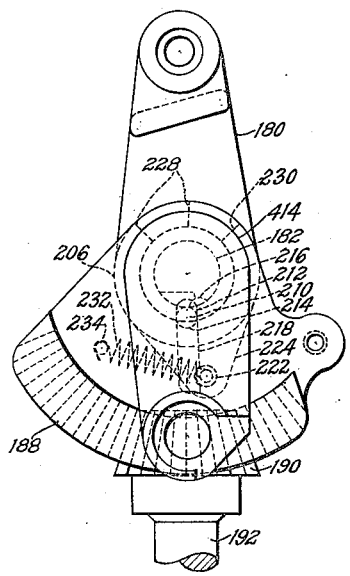
Figure 25:
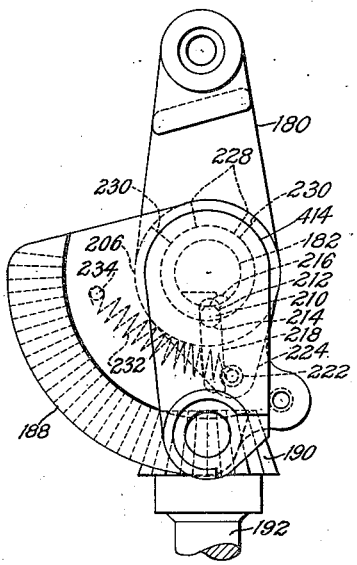

In order to permit a continued turning movement of the jack, during the operation of the machine on a shoe after the toggle links 72 and 74 have been brought into alinement, the gear segment 188 is provided with a tooth 228 fitting within a segmental notch 230 in the hub of the intermediate member 206, which notch is of sufficient width to permit a limited amount of lost motion of the tooth 228 therein. The lost motion is taken up while the toggle links are being alined by a coiled spring 232 attached at one end to the cross pin 222 carried by the intermediate member 206 and at its other end to a stud 234 projecting from the gear segment 188. During operation of the gear segment after the toggle links are alined, the arm 180 takes a position as shown in Fig. 24 and is prevented from further movement by the toggle links. The gear segment 188 is then moved independently against the tension of the spring 232, as shown in Fig. 25. The toggle is broken at the beginning of the reverse rotation of the jack, as will be hereinafter described and the extent of the lost motion of the gear segment is sufficient to allow this to be accomplished while the tooth 228 on the gear segment 188 is returning to its position of engagement with the end of the notch 230 of the intermediate member 206.

The devices for breaking the alinement of the toggle links upon placing a lasted shoe on the jack comprise a dog 236 (see Figs. 6, 7, and 28 to 31) pivoted in a hollow block 238, and a slide piece 240 slidably mounted on a pin 242 passing through a slot in the slide piece and being fixed at its ends in the movable jacking member. The upper end of the slide piece is formed with an elongated recess 244 to slide upon a shaft 178 to which one end of the toggle is also connected. Before a shoe is placed on the jack, the parts assume the positions shown in Fig. 6. The slide 240 is held in raised position by a spring 248 stretched between a pin at the lower end of the slide 240 and a pin extending from one end of a toggle breaking lever 250 pivotally mounted on the central part of the toggle link 72, with one end extending beneath a portion of the slide 240 and with the other end of the lever projecting beneath a shoulder 252 of the toggle link 74 when the links are in alinement. Downward movement of the slide 240 causes a curved surface 254 of the slide to engage the toggle breaking lever 250 and rock it against the shoulder on the link 74. The toggle is thereby broken, permitting the movable jacking member to move toward the stationary jacking member. Downward movement of the slide 240 is effected by actuation of the hollow block 238 and the dog 236, as a result of downward pressure of a lasted shoe on the last pin 10 as hereinafter described. The jacking member 14 is yieldingly supported at this time by the spring 172 and consequently is moved downwardly more or less by the downward pressure on the shoe thereby changing the angular relation of the link 72 to the movable jacking member. The position of the movable jacking member and the angular relation of the toggle to the movable jacking member will also vary somewhat with different sizes of shoes. Consequently, in order to obtain a uniform and certain breaking of the toggle, regardless of the position of the movable jacking member, the surface 254 is concentric with the shaft 178, connecting the end of the toggle. Movement of the toggle actuating lever 250, thus, will be unaffected by the variations in the angular relation of the toggle to the movable jacking member.

As illustrated, the means for actuating the toggle breaking mechanism includes a plunger 256 sliding within a hole in the center of the last pin, arranged to impart downward movement to the dog 236 through a rod 258 connected at its lower end to the hollow block 238. The rod 258 carries at its upper end a plate 260 supported on the rod by a pin 242. The rod 258 is slidably mounted in a bore extending through the last pin lever 56 and through the center of a tubular extension 264 from the lever. The block 238 is slidably mounted on this extension. The rod 258 is yieldingly held at the limit of its upward movement by a compression spring 266 coiled about the rod 258, and confined between the pin 242 and a shoulder formed in the last pin lever 56, said lever being cut away sufficiently to provide the desired clearance for the movement of the spring 266 and the plate 260. The upward movement of the rod 258 and of the plunger 256 is limited by a pin 268 mounted in the last pin lever arranged to be engaged by a shoulder 270 forming the lower extremity of a recess in the plunger 256. To permit freedom of movement of the block 238 upon the extension 264 of the last pin lever, a vent 272 is provided at the lower end of the block. The slide engaging dog 236 is pivotally mounted between parallel lugs 274 formed in the block 238. When there is no shoe upon the last pin, the dog is in the position illustrated by Figs. 6 and 28, its inner extremity engaging the block 238 and its lower extremity being positioned to engage an upward projection 276 of the slide 240. The depression of a shoe in engagement with the last pin forces the dog, 236 downwardly into engagement with the slide, and forces the slide downwardly against the toggle breaking lever 250, swinging the lever in a counterclockwise direction as viewed in Fig. 6, and causing the lever to impart an upward movement to the shoulder 252 of the link 74, thereby breaking the alinement of the toggle links. In order to prevent interference between the dog 236 and slide 240 during the swinging movement of the last pin lever 56 from the position indicated in Fig. 6 to that indicated in Fig. 7 while the shoe is being released from the jack, the dog is yieldingly maintained in slide engaging position so as to be swung on its pivot by the projection 276 of the slide. To these ends, a spring 278 is secured to the tubular extension 264 of the last pin lever by means of a collar 280 and a notch in the extension into which an angular bend in the upper end of the spring fits. The spring is bent at its lower extremity to bring its free end into position to engage the dog 236 at the base of a recess 282 formed therein. The spring 278 is so arranged relatively to the dog 236, that it holds the dog in the position illustrated by Fig. 28 when the block 238 is raised by the spring 266 and there is no shoe on the jack. The downward movement of the dog 236, effected by downward pressure of a shoe upon the last pin, changes the relative position of the spring 278 and dog 236, so that the spring tends to rotate the dog in a counterclockwise direction into the position illustrated by Fig. 29. To prevent such a rotation of the dog before the toggle has been broken, the interengaging surfaces of the dog 236 and the slide 240 are beveled. After breaking the toggle, the dog 236 is moved bodily to the right of the upward projection of the slide 240 by the tilting of the last pin incidental to the positioning movement of a shoe, and the dog is rotated in a counterclockwise direction by the spring 278 into the position illustrated by Fig. 30. In order to provide clearance between the dog and the upward projection 276 of the slide 240 during the reverse rotation of the jack to return the parts to their initial relation, a notch 284 is formed in the lower surface of the dog 236. Before the shoe is removed from the jack, the parts take the positions shown in Fig. 29. The dog is returned to its original position in lifting the shoe from the last pin, at which time the dog is rotated in a clockwise direction by the spring 278, and as the dog escapes the projection during the upward movement of block 238 as in Fig. 31, it returns to the position illustrated by Fig. 28.

In order to center the toe portion in a direction widthwise of the shoe upon the toe support 44, and to hold the toe portion of the shoe rigidly against lateral movement upon the toe support, a feature of the invention is embodied in a pair of toe grips 46 and 48 positioned to engage the opposite sides of the bulging upper at the toe portion of the shoe. Referring particularly to Figs. 4, 9 and 10, the toe grips comprise T-shaped pieces having convex shoe engaging surfaces 286 and 288 covered with leather to prevent marring of the shoe upper. The lower arms of the toe grips are cylindrical and are positioned within sockets in movable supporting members 290 and 292 respectively, which are normally held at the limit of their movement away from each other by a coil spring 294 stretched between a stud 296 on the stationary jacking member and a stud 298 in the member 290. The toe grips are held within the members 290 and 292 by studs 300 and 302 passing loosely through indentations in the lower toe grip arms to permit limited rotation. The members 290 and 292 are caused to move in opposite directions by an H-shaped lever 304 fulcrumed centrally at 306 on a fixed lug 308 projecting from the stationary jacking member. The lower end of the lever 304 is provided with slots 310 and the upper end of the lever is pivotally connected by the screw 302 to the member 292. The toe grips 46 and 48 are brought into engagement with the toe portion of the shoe by the operation of the manual jacking lever 168 (see Fig. 1), connections between the lever and the toe grips comprising a yoke 312 pivoted at 314 on the stationary jacking member, a link 316 pivoted at 318 to one end of the jacking lever and at 319 to the yoke, a bell-crank lever 320 (see Figs. 8 and 9) pivoted at 322 on a lug 324 projecting from the stationary jacking member and arranged to impart the desired movements to the toe grips, and a link 326 connecting the bell-crank lever 320 and the yoke 312. The bell-crank lever 320 actuates the toe grip 46 through a pivot 328 connected with a downward extension 330 of the member 290, and actuates the toe grip 48 through the action of the ends of the pivot 328 sliding in the slots 310 of the lever 304. The upper end of the member 290 is pivotally connected by the ends of the screw 300 to an H-shaped link 334 pivoted at 336 to a lug 338 extending laterally from the frame of the stationary jacking member at the same elevation as the lug 308 and at the opposite side of the jacking member. The member 292 is maintained in proper angular position during movement by a boss 342 (see Figs. 10 and 11) projecting laterally from the extension 330 of member 290 and engaging with a guideway 344 formed in a horizontal extension 346 of the member 292. In order to impart a downward movement to the toe grips 46 and 48 to cause them to engage different sizes of shoes uniformly, the link 334 and the upper end of the lever 304 are arranged to be in a substantially vertical position when the toe grips 46 and 48 are at the limit of their movement away from each other, as illustrated by Fig. 9. When these members are swung into an angular position toward each other, they move downwardly in clamping the shoe, as illustrated in Fig. 10.

In order to lock the toe grips in position after engaging the shoe, a locking block 348 is provided, (see Fig. 11) having ratchet teeth formed on its inner surface for engagement with ratchet teeth formed on the extension 346 of the member 292, said interengaging ratchet teeth being so arranged that when engaged they hold the toe grips against movement away from each other while permitting movement toward each other. The block 348 is attached at one end of a stud 352 slidably mounted in a central part of the extension 330 of the member 290, the stud 352 which extends from the block passing through the center of the boss 342. The block is yieldingly held in locking position by a compression spring 356 coiled about the stud 352 and confined in a recess between the extension 330 and a hollow block 358, threaded to the end of the stud 352 and slidably mounted within the recess. To maintain the desired parallel relation between the interengaging ratchet teeth formed in the block 348 and on the extension 346 of the member 292, the block 348 is formed with a guide projection 360 arranged to slide within the guideway 344 formed in said extension. At the beginning of the reverse rotation of the jack, the locking block 348 is disengaged from the extension 346 of the member 292 by a bell-crank lever 362 pivoted on the stud 96 which holds the rack 64 in engagement with the pinion 76 (see Figs. 4 and 5). The bell-crank lever 362 is actuated by an extension 364 of the pawl lever 102 when the pawl lever is moved to unlock the ratchet wheel 162, as hereinafter described, and has a lateral extension 366 to maintain a constant engagement with the hollow block 358 in all positions of the member 292.

The embodiment of the feature of the invention which contemplates adjusting the toe support vertically to compensate for variations in different styles and sizes of toes is illustrated in Fig. 16, in which the toe supporting plate 44 is shown as being pivotally mounted at 370 in the stationary jacking member. The toe supporting plate extends from its pivot in the direction of the toe of a jacked shoe, the free end of the plate being bent downward slightly to accommodate it to the contour of a shoe. The plate is positioned by a cam arm 372 rotatable about a fixed pin 374 and actuated from an eccentric portion 376 of the shaft 88. To enable the operator to adjust the toe support vertically, a knurled knob 378 is secured to one end of the shaft 88. The cam arm 372 engages the under surface of the toe supporting plate, and is arranged to be actuated from the eccentric 376 through a link 380 pivoted at 382 to the cam arm. The lower extremity of the link is bifurcated at 384 for engagement with the eccentric portion 376 of the shaft 88. The link 380 is maintained in the proper position lengthwise of the eccentric by shoulders 386 and 388 at the ends of the eccentric portion of the shaft. In order to secure the toe support in adjusted position, a plate 390 is secured to one end of the eccentric shaft 88 and carries a stud 392 arranged to engage in one of a series of holes 394 formed in the jack frame. The shaft 88 is mounted for axial as well as rotary movement and the stud 392 is normally held in engagement with the frame by a compression spring 396 coiled about the shaft 88 and confined between the flanged end of a bushing 86 and the hub of the knob 378. In order to indicate the various vertical adjustments of the toe support plate 44 and to provide a convenient means for its adjustment into a predetermined position, a pointer 398 is secured to the shaft beneath the hub of the knob 378, and numerals are inscribed upon a stationary housing 400 for the ratchet wheel 82, each numeral representing one of the holes 394.

An important feature of the invention is embodied in mechanism to bring the toe grips 46 and 48 into engagement with the toe portion of the shoe, then to impart clockwise rotation to the ratchet wheel 162, in order to bring the radial edge of a tooth thereon into positive engagement with the detent 164 of the pawl 102 (see Figs. 19 and 20), and finally to impart a clamping pressure to the toe grips 46 and 48 and a downward pressure to the toe portion of the shoe, thus locking the jack securely against movement and securing the toe portion of the shoe rigidly in position upon the toe support. In the embodiment of this feature illustrated in Figs. 1 and 5, the mechanism is operated by the manual jacking lever 168 pivotally mounted at 402 on the free end of an arm 404 secured to the eccentric shaft 20 on which the movable jacking member is mounted. The lever 168 actuates the toe grips 46 and 48 through connections hereinbefore described, and causes the ratchet wheel 162 to be rotated by swinging the arm 404 in a clockwise direction, thereby rotating the eccentric shaft 20 on which the movable jacking member is mounted, and thus imparting a downward movement to the movable jacking member, a swinging movement to the shoe itself, and through the swinging movement of the shoe a tilting movement to the last pin, a swinging movement to the lever 60 to which the lock rack 158 is pivoted, and through the lock rack 158, a clockwise rotation to the pinion 159 and ratchet wheel 162, all as hereinbefore described. In actuating the toe grips 46 and 48, the jacking lever 168 swings in a clockwise direction about its pivotal connection 402 with the arm 404, which arm is yieldingly held in lowered position by the coiled spring 172 acting on the eccentric shaft 20. After the toe grips have been brought into engagement with the toe of the shoe, the continued movement of the jacking lever 168 causes it to swing about its pivotal connection 318 with the link 316 and to impart a clockwise rotation to the arm 404 and the eccentric shaft 20. After a tooth on the ratchet wheel 162 has been brought into firm engagement with the detent 164 of the pawl 102, continued movement of the jacking lever 168 operates jointly upon the link 316 and the arm 404 to impart a clamping pressure to the toe grips, and through the downward movement of the movable jacking member to press the toe portion of the shoe firmly against the toe supporting plate 44. The operation of the jacking lever 168 is accomplished by a single upward movement of approximately thirty degrees, and the lever is positioned to enable the operator to actuate it conveniently.

In order to secure the arm 404 and the eccentric shaft 20 in adjusted position, a series of ratchet teeth 406 (see Figs. 1, 5, and 21) are formed on the hub of the arm 404, concentrically of the axis of the intermediate portion 167 of the eccentric shaft 20, and a pawl 408 is pivotally mounted upon a headed stud 410 threaded into the central portion of the jack frame. The pawl is adapted, when brought into engagement with the ratchet teeth 406 to hold the eccentric shaft 20 against counter-clockwise rotation while permitting clockwise rotation thereof. The pawl 408 is tensed toward the ratchet teeth 406 by a spring-pressed pin 412 positioned within a vertical bore in a block 414 and arranged to engage the upper surface of the pawl 408. To secure the block 414 in a fixed position upon the central portion of the jack frame, its upper end is secured to the stud 182, and its lower end is arranged to receive the stud 410. The block 414 is recessed to provide clearance for the head of the stud 410 and for the hub of the pawl 408. The movement of the pin 412 within the block 414 is limited by a notch 416 formed in the pin and a pin 418 passing through the block 414 in position to engage within the notch 416. The stud 410, therefore, not only serves to fulcrum the pawl 408, but also prevents rotation of the block and the stud 182 to which the block is attached, thus securing proper operation of the toggle mechanism.

For convenience in assembling the parts, an eccentric split bushing 420 (see Figs. 6 and 7) is interposed between the eccentric shaft 20 and the central portion of the jack frame. Other bushings are arranged between the eccentric shaft and the movable jacking member to fill the openings necessary to slip the parts in place. The bushings are held from rotating by keys 422 of ordinary construction inserted within suitable keyways.

In the illustrated construction, the detent 164 of the pawl lever 102 is automatically disengaged from the ratchet wheel 162 at the beginning of the reverse rotation of the jack to permit the movable jacking member to be moved away from the stationary member to release the shoe. For this purpose the downwardly curved arm 108 of the pawl lever is arranged to be actuated from the gear segment 188 through a slide 424 and an arm 426 pivotally mounted on the pivot 314 (see Fig. 27). The arm 426 is normally held out of engagement with the pawl 102 by means of the spring 430 coiled about the hub of the arm 426 and having one end hooked about the frame of the stationary jacking member and the other end hooked about the arm 426. The segment 188 actuates the arm 426 through the slide 424, pivotally connected thereto at 432, and a dog 434 pivotally mounted on a stud 436 projecting from a recessed surface of the slide. The dog is arranged to engage within a recess 438 formed in the arm 426. To guide the movements of the slide 424 so as to bring the dog 434 into engagement with the arm 426, a block 440 is pivoted upon the stud 314 and has a guideway 442 formed therein for the reception of the slide 424. To permit a slight swinging movement of the slide in accordance with the rotary movement of the segment 188, the guideway 442 is formed with its sides diverging slightly in both directions from a position equally distant from its ends. At the beginning of the reverse rotation of the jack, the dog 434 engages the arm 426 within the recess 438. At an early stage in the reverse rotation of the jack, a portion 444 of the dog engages the beveled extremity of the recess 438, swinging the arm 426 in a direction to actuate the pawl 102, the dog being held from counter-clockwise rotation by the engagement of an extension 446 on the dog with an abutment formed in the slide 424. During the reverse rotation of the jack the dog 434 slides along the arm 426, holding the arm in the position illustrated by Fig. 27. In this position, the arm holds the pawl lever 102 out of ratchet engaging position, permitting the return of the lock rack 158 to its original position. At the end of the reverse rotation of the jack, the dog 434 is moved to a position clear of the arm 426 and the arm is returned to its normal position by the spring 430 (see Fig. 4). As the dog 434 moves downwardly during the forward rotation of the jack, the point 444 of the dog engages the upper part of the arm 426 and the dog is swung into an inoperative position and slidingly moved along the lever until it comes to a point opposite the recess 438. As the dog moves into said recess it is returned to its operative position by a spring 448 positioned within a recess 450 in the slide 424. The spring 448 is secured within said recess by engagement within a hole 452 formed in the slide, and is bent at its free end for engagement with a pin 454 mounted in the tail of the dog 434.

The toe grips 46 and 48 are permitted to be disengaged from the shoe as the jack commences its reverse rotation in order to leave the shoe free to be withdrawn from the toe support and also to reset the toe grips for the reception of another shoe. As has been stated, the toe grips are held in shoe engaging position by the locking block 348 (see Fig. 11) against the tension of the spring 294 which normally moves the toe grips to the limit of their movement away from each other. In order to disengage the locking block from the ratchet surface of the extension 346 of the toe grip member 292 and to permit the return of the toe grips to normal position, the locking block is arranged to be actuated from the pawl lever 102 through the bell-crank lever 362. One arm 456 of the bellcrank lever 362 is arranged to be engaged by the cam extension 364 on the pawl lever 102. The bell-crank lever 362 imparts movement to the locking block through the arm 456, as previously described, as the jack commences its reverse rotation, swinging the bell-crank lever 362 into the position indicated in Figs. 4 and 11. The locking block 348 is returned to locking position by the spring 356 as the toe of the shoe is brought into engagement with the feeler 84 and the feeler is swung in a direction lengthwise of the shoe, and through connections above described, releases the pawl 102 to permit its return to the position indicated by Fig. 5.

It is sometimes desirable to remove the shoe from the jack before the completion of an operation thereon. To this end, provision has been made of means for unjacking a shoe in any stage of operation desired. As illustrated, this feature of the invention is obtained by securing a hand operated finger 460 to the pawl lever 102 and extending it upwardly therefrom into a position for convenient manipulation by the operator. The pawl lever 102 may be retracted by moving the finger 460, and the movable jacking member may then be actuated manually to withdraw the toe of the shoe from the toe support.

In order to prevent the actuation of the jack locking mechanism by accidental movement of the feeler lever 84, and to release the pawl 408 from ratchet teeth on the eccentric shaft 166 when there is no shoe in the jack, a guard mechanism is provided for holding the pawl lever 102 out of ratchet engaging position while the jack is in its original or starting position. The guard mechanism includes a bell-crank lever 470 (see Fig. 21) pivoted on a boss 472 projecting from the inner side of the arm 404, and formed at its upper end with a slot 473 engaging the shaft 178 by which the toggle is connected to the movable jacking member. To prevent any change in the position of the lever 470 during rotation of the eccentric shaft 20 in jacking a shoe, the boss 472 is positioned concentrically on the arm 404 with the intermediate portion 167 of the eccentric shaft, which rotates in the stationary jacking member. This construction causes the lever 470 to be actuated with the movable jacking member while maintaining the desired relation between the lever 470 and the pawl 408. As the jack approaches the limit of its reverse rotation and the movable jacking member approaches the limit of its movement away from the stationary jacking member, the short arm of the bell-crank lever 470 engages a pin 474 projecting inwardly from the pawl 408, swinging the pawl in a counter-clockwise direction away from the ratchet teeth 406 and lifting a link 476 connecting the pawl 408 and the pawl lever 102. The link 476 is guided at its lower end by a pin 478 projecting from the central portion of the jack frame positioned to slide within a slot 480 formed in the link, the link being held against lateral movement outwardly from the jack frame by an extension 482 of the pawl. The upper end of the link 476 is pivoted to an arm 483 of the pawl lever 102 and a pin 484 is carried by the lower end of the link for engagement with the upper surface of the extension of the pawl, thus providing a lost motion connection so that the pawl lever 102 may be operated independently. The disengagement of the pawl 408 from the ratchet teeth 406, releases the jacking lever 168 and permits it to be returned to normal position by the spring 172.

The link 174 is arranged to be moved as a unit with the arm 170 during part of the rotation of the eccentric shaft 20 (see Fig. 21) and as the jacking lever 168 arrives at its normal position, the added leverage of the link 174 enables it to overcome the tendency of the jacking lever to cause an overthrow of the eccentric shaft. To secure this result a projection 486 of the link 174 enters between lugs through which the pivot pin 173 passes, and is arranged to engage with the base of the notch between the lugs when the jacking lever is in normal position, and to be disengaged therefrom by the operative movement of the jacking lever.

When a shoe is secured in position on the jack, the parts assume a relation indicated in Figs. 1 and 7. With the parts in this relation, the shoe may be released either by a movement of the hand operated release finger 460 or, at the end of the operation on the shoe, by the return movement of the jack to starting position.

If the manual release finger 460 is moved toward the stationary jacking member 18, the pawl lever 102 is retracted from the ratchet wheel 162, permitting movement of the rack 158 away from the stationary jacking member 18. The toe end of the shoe may now be raised from the toe support with a rocking movement about the pivot 12 which forms a fulcrum for the last pin lever 56. At the same time that the pawl lever 102 is released from the ratchet wheel 162, the extension 104 of the pawl lever 102 moves the dog 92 away from the pawl 80, tending to move the pawl 80 through the action of the spring 90 away from its ratchet wheel 82. If, at this time, the shoe is forcibly moved away from the stationary jacking member 18, the pressure of the ratchet wheel 82 on the pawl 80 will be relieved so that the pawl may move under the action of the spring 90 away from the ratchet wheel. The lock for the toe grips is also released through the action of the cam extension 364 on the pawl lever 102 against the arm 456 of the lock-releasing bell crank 362. The movable jacking member 14 may now be moved toward the left away from the stationary jacking member against the action of the spring 58 until the toggle links 72 and 74 reach a position of alignment. During this movement, the lever 470 moves with the movable jacking member to raise the pawl 408 away from the ratchet teeth 406 and allow the eccentric shaft 20 to be rotated in a counter-clockwise direction from the position shown in Fig. 1, which causes the movable jacking member to be raised with relation to the jack. While the movable jacking member is moving away from the stationary jacking member, the stop rack 64 rotates the shaft 78 which carries the cam 118, thereby permitting the feeler lever 84 to be raised to its highest position through the operation of the bell crank 126 and the slide link 128. As the jacking lever 168 is moved downwardly the toe grippers 46 and 48 separate under the action of the spring 294. As the shoe is removed from the last pin, the plunger 256 rises to its highest position. Upon introducing a new shoe upon the jack, the plunger 256 is depressed, causing the alignment of the toggle links 72 and 74 to be broken. The movable jacking member 14 will then be moved toward the stationary jacking member 18 by the spring 58 until the toe of the shoe strikes the feeler lever 84. During this movement, the feeler lever has moved downwardly in accordance with the extent of movement between the jacking members so that it will not project above the bottom surface of the shoe. The thickness of the toe portion of the shoe being approximately proportional to the length of the shoe, the downward movement of the feeler lever is made to correspond. As the toe of the shoe strikes the lever 84, it swings the lever about the pin 120 to release the latch 98 from the pawl lever 102 so that the locking pawl 80 and pawl lever 102 may re-engage their respective ratchet wheels. An upward movement of the jacking lever 168 will now cause the toe grippers 46 and 48 to be moved forcibly against the upper of the shoe adjacent the toe, and the movable jacking member 14 to be moved downwardly, tightening the locking pawls against their respective ratchet wheels and forcing the toe into firm engagement with the toe support.

The shoe is automatically released at the end of the operation on the shoe in substantially the same manner as by operation of the manual release finger 460, except that movement of the pawl lever 102 from engagement with the ratchet wheel 162 is produced through the gear segment 188. The gear segment moves the slide 424 upwardly until the dog 434 engages the arm 426, thrusting it against the downwardly curved arm 108 of the pawl lever 102. This occurs before the arm 180 for opening the jack begins to move so that, during the return movement of the jack to starting position, the jack is first unlocked and then automatically opened by means of the toggle links.

The nature and scope of the invention having been indicated and the preferred embodiment of the invention having been specifically described, what is claimed as the invention is:

1. A shoe supporting jack having, in combination, a heel support and a toe rest relatively movable toward and from each other, means for relatively moving the heel support and toe rest yieldingly toward each other to locate a shoe longitudinally on the jack, and means for thereafter locking the heel support and toe rest against movement away from each other.

2. A shoe supporting jack having, in combination, a heel support and a toe rest relatively movable toward and from each other, means for relatively moving the heel support and toe rest yieldingly toward each other to locate a shoe longitudinally on the jack, and manually operable means for thereafter relatively moving the heel support and toe rest to clamp the shoe on the jack.

3. A shoe supporting jack having, in combination, a tilting heel support and a toe rest relatively movable toward and from each other, means including a spring for relatively moving the heel support and toe rest yieldingly toward each other to locate a shoe on the jack and for then tilting the heel support to force the toe of the shoe against the toe rest, and manually operable means for thereafter continuing the tilting movement of the heel support to clamp the shoe on the jack.

4. A shoe supporting jack having, in combination, a jack frame, a toe rest mounted on the frame, an arm pivotally mounted on the frame to swing toward and from the toe rest, a heel support on the arm, means for swinging the arm yieldingly toward the toe rest to locate a shoe longitudinally on the jack, and manually operable means for thereafter moving the pivoted end of the arm to clamp the shoe between the heel support and toe rest.

5. A shoe supporting jack having, in combination, a jack frame, a toe rest mounted on the frame, an arm pivotally mounted on the frame to swing toward and from the toe rest, a tilting heel support mounted on the arm, means including a spring for swinging the arm yieldingly toward the toe rest to locate a shoe longitudinally on the jack and for then tilting the heel support to force the toe of the shoe against the toe rest, and manually operable means for thereafter continuing the tilting movement of the heel support to clamp the shoe on the jack.

6. A shoe supporting jack having, in combination, a jack frame, a toe rest on the jack frame, a shaft journaled in the frame having an eccentric portion, an arm mounted on the eccentric portion of the shaft to swing toward and away from the toe rest, a lever pivotally mounted on the arm, a last pin carried by the lever, a slide guided at one end in the jack frame, connections between the other end of the slide and said lever, mechanism for locking the slide against movement in the jack frame, and means for rotating the shaft to move the arm and thereby the last pin with relation to the toe rest after the slide is locked.

7. A shoe supporting jack having, in combination, a jack frame, a toe rest on the jack frame, a shaft journaled in the frame having an eccentric portion, an arm mounted on the eccentric portion of the shaft to swing toward and away from the toe rest, a lever pivotally mounted on the arm, a last pin carried by the lever, a second lever also pivoted on the arm, means connecting said levers for rotation in opposite directions, a slide pivoted at one end to the latter lever and guided at the other end in the jack frame, mechanism for locking the slide to prevent separation of the last pin from the toe rest, and means for rotating the shaft to move the arm and thereby to swing the last pin toward the toe rest after the slide is locked.

8. A shoe supporting jack having, in combination, a jack frame, a toe rest on the frame, a shaft journaled in the frame having an eccentric portion, a heel supporting arm mounted on the eccentric portion of the shaft to swing toward and from the toe rest, a lever pivotally mounted on the arm, a last pin carried by the lever, a second lever also pivoted on the arm, means connecting said levers for rotation in opposite directions, a slide pivoted at one end to the arm and guided at the other end in the jack frame, a second slide pivoted at one end to the latter lever and guided at the other end in the jack frame, mechanisms for locking one of said slides against movement in one direction and the other slide against movement in the other direction, and means for rotating the eccentric shaft to move the heel supporting arm to cause the last pin to swing toward the toe rest about the pivotal mounting of the last pin lever on the heel supporting arm.

9. A shoe supporting jack having, in combination, a jack frame, a toe rest on the frame, a shaft journaled in the frame having an eccentric portion, a heel supporting arm rotatable about the eccentric portion of the shaft, a lever pivotally mounted on the arm, a last pin carried by the lever, a second lever also pivoted on the arm, means connecting said levers for rotation in opposite directions, a slide pivoted at one end to the arm and guided at the other end in the jack frame, a second slide pivoted at one end to the latter lever and guided at the other end in the jack frame, a pawl for locking the first slide to prevent movement of the heel supporting arm toward the toe rest, a second pawl for locking the second slide to prevent movement of the heel supporting arm away from the toe rest, and means for rotating the shaft to cause the heel supporting arm to move about the pivoted end of the first slide and to take up lost motion between the slides and the pawls for locking the slides.

10. A shoe supporting jack having, in combination, a jack frame, a toe rest on the frame, a shaft journaled in the frame having an eccentric portion, a heel supporting arm rotatable about the eccentric portion of the shaft, a lever pivotally mounted on the arm, a last pin for supporting the heel portion of a lasted shoe carried by the lever, a second lever also pivoted on the arm, gearing connecting said levers, a spring between the latter lever and the jack frame acting when released to draw the heel supporting arm toward the toe rest and to swing the last pin about the pivot of the last pin lever in a direction to rock the toe of the shoe downwardly against the toe rest, a slide pivoted at one end to said latter lever and guided at the other end in the jack frame, a pawl for locking the slide to prevent movement of the heel supporting arm away from the toe rest, and means for rotating the shaft to cause a strain to be exerted upon said slide and to take up lost motion between the slide and the pawl.

11. A shoe supporting jack having, in combination, a jack frame, a toe rest on the frame, a heel supporting arm movable on the frame, a lever pivotally mounted on the arm, a last pin for supporting the heel portion of a lasted shoe carried by the lever, a second lever also pivoted on the arm, gearing connecting said levers, a spring between the latter lever and the jack frame acting when released to draw the heel supporting arm toward the toe rest and to swing the last pin about the pivot of the last pin lever in a direction to rock the toe of the shoe downwardly against the toe rest, a slide pivoted at one end to the heel supporting arm and guided at the other end in the jack frame, a second slide pivoted at one end to the latter lever and guided at the other end in the jack frame, a pawl for locking the first slide to prevent movement of the heel supporting arm toward the toe rest, a pawl for locking the second slide to prevent movement of the said latter lever away from the toe rest, and means for withdrawing the pawls from locking position comprising a member for retracting the second pawl and for applying a resilient strain on the first pawl to allow it to remain in locking position until the heel supporting arm is moved against the action of said spring away from the toe rest.

12. A shoe supporting jack having, in combination, a heel support and a toe rest relatively movable toward and from each other, said parts being arranged for relative movement toward each other to locate a shoe on the jack, and means controlled by the shoe for stopping the relative movement of the heel support and toe rest toward each other and for locking the heel support and toe rest against movement away from each other.

13. A shoe supporting jack having, in combination, a heel support and a toe rest relatively movable toward and from each other, said parts being arranged for relative movement toward each other to locate a shoe on the jack, and means for locking the heel support and toe rest against movement away from each other comprising a slide connected with one of said parts, a rotatable shaft, gearing connecting the shaft and the slide, a ratchet wheel mounted on the shaft, a pawl for engaging the ratchet wheel normally held out of engagement therewith, and means for moving the pawl into engagement with the ratchet wheel when the shoe is brought to a predetermined position on the jack.

14. A shoe supporting jack having, in combination, a heel support and a toe rest relatively movable toward and from each other, means for relatively moving the heel and toe support yieldingly toward each other to locate a shoe on the jack, and means for locking the heel support and toe rest against movement away from each other comprising a slide connected with one of said parts, a rotatable shaft, gearing connecting the shaft and the slide, a ratchet wheel mounted on the shaft, a pawl for engaging the ratchet wheel, and means acting when operated to disengage the pawl from the ratchet wheel and thereafter to move the heel support and toe rest relatively away from each other.

15. A shoe supporting jack having, in combination, a heel support and a toe rest relatively movable toward and from each other, means for relatively moving the heel support and toe rest yieldingly toward each other to locate a shoe on the jack, a stop device for arresting the relative movement of the heel support and toe rest toward each other, a locking device for locking the heel support and toe rest against movement away from each other, a feeler for engagement with the shoe, and connections intermediate the feeler and the stop and locking devices for controlling the action of the stop and locking devices.

16. A shoe supporting jack having, in combination, a heel support and a toe rest, relatively movable towards and from each other, means for relatively moving the heel support and toe rest yieldingly toward each other to locate a shoe on the jack, a locking device, means for actuating said locking device to lock the heel support and toe rest against movement away from each other, and means acting when operated to actuate the locking device to release the heel support and toe rest and thereafter to move them relatively away from each other.

17. A shoe supporting jack having, in combination, a heel support and a toe rest, relatively movable towards and from each other, means for relatively moving the heel support and toe rest yieldingly toward each other to locate a shoe on the jack, a locking device, means for actuating said locking device to lock the heel support and toe rest against movement away from each other, means acting when operated to actuate the locking device to release the heel support and toe rest and thereafter to move them relatively away from each other, and manually operable means for actuating the locking device to release the heel support and toe rest.

18. A shoe supporting jack having, in combination, a heel support and a toe rest relatively movable toward and from each other, means for relatively moving the heel support and toe rest yieldingly toward each other to locate a shoe on the jack, means for locking the heel support and toe rest against movement away from each other, and manually operable means for thereafter moving the heel support to clamp the shoe on the jack.

19. A shoe supporting jack having, in combination, a heel support and a toe rest relatively movable toward and from each other, means for relatively moving the heel support and toe rest yieldingly toward each other to locate a shoe on the jack, a stop device for arresting the relative movement of the heel support and toe rest toward each other, a feeler for engagement with a shoe, connections intermediate the feeler and stop device for controlling the action of the stop device, and means for rendering said connections operative to permit an actuation of the stop device only after the initiation of the relative movement toward each other of the heel support and toe rest.

20. A shoe supporting jack for supporting a lasted shoe with its sole uppermost having, in combination, a frame, a toe rest mounted on the frame, a heel support, an arm pivotally mounted on the frame to swing toward the toe rest to locate a shoe longitudinally on the jack, and manually operable means for moving the arm downwardly after the shoe has been thus located on the jack to clamp the shoe between the heel support and the toe rest.

21. A shoe supporting jack for supporting a lasted shoe with its sole uppermost having, in combination, a frame, a toe rest mounted on the frame, a shaft provided with an eccentric portion journalled in the frame, a heel support, an arm carrying the heel support pivotally mounted on the eccentric portion of the shaft to swing toward the toe rest to locate a shoe longitudinally on the jack, and means for rotating the eccentric shaft after the shoe has been thus located to move the arm downwardly to clamp the shoe between the heel support and the toe rest.

22. A shoe supporting jack having, in combination, a heel support and a toe rest relatively movable toward and from each other, means for relatively moving the heel support and toe rest yieldingly toward each other to locate a shoe on the jack, a locking device for locking the heel support and toe rest against movement away from each other after the shoe has been thus located on the jack, and manually operable means for actuating the locking device to release the heel support and toe rest to permit them to be moved relatively away from each other.

23. A shoe supporting jack having, in combination, a heel support and a toe rest relatively movable toward and from each other, said parts being arranged for relative movement toward each other to locate a shoe on the jack, a locking device for locking the heel support and toe rest against movement away from each other after the shoe has been thus located on the jack, means for moving the locking device to inoperative position, and a latch for retaining the locking device in inoperative position during the movement of the heel support and toe rest away from each other.

24. A shoe supporting jack having, in combination, a frame, a toe rest on the frame, a heel support mounted on the frame to move toward the toe rest to locate a shoe longitudinally on the jack, means for arresting the movement of the heel support toward the toe support comprising a member arranged to engage the toe of the shoe, and means operating automatically to adjust the height of said member above the toe rest for operation on shoes of different sizes.

25. A shoe supporting jack having, in combination, a frame, a movable heel support and a stationary toe support mounted thereon, a feeler carried by the toe support, mechanism operable by engagement of the toe of the shoe with the feeler for arresting the movement of the heel support toward the toe support, and means operable by the movement of the heel support for adjusting the height of the feeler above the toe rest.

26. A shoe supporting jack having, in combination, a heel support and a toe rest relatively movable toward and from each other, said parts being arranged for relative movement toward each other to locate a shoe longitudinally on the jack, a feeler arranged to be engaged by the toe of the shoe, means controlled by the feeler for stopping the relative movement of the heel support and toe rest, and means operated by the relative movement of the heel support and toe rest for adjusting the height of the feeler above the toe rest for operation with shoes of different sizes.

27. A shoe supporting jack having, in combination, a heel support and a toe rest relatively movable toward and from each other, said parts being arranged for relative movement toward each other to locate a shoe on the jack, means for arresting the relative movement of the heel support and toe rest toward each other comprising a slide connected with one of said parts, a rotatable shaft, gearing connecting the shaft and the slide, a ratchet wheel mounted on the shaft, a pawl arranged to arrest the rotation of the ratchet wheel normally held out of engagement therewith, means for moving the pawl into engagement with the ratchet wheel when the shoe is brought to a predetermined position on the jack comprising a feeler arranged to be engaged by the toe of the shoe, and connections between the rotatable shaft and the feeler for adjusting the height of the feeler above the toe rest for operation with shoes of different sizes.

28. A shoe supporting jack having, in combination, a heel support and a toe rest relatively movable toward and from each other, means for relatively moving the heel support and toe rest yieldingly toward each other to locate a shoe on the jack, a stop device for arresting the relative movement of the heel support and the toe rest toward each other, and means actuated by the relative movement of the heel support and toe rest toward and from each other for preventing actuation of the stop device prior to the initiation of the relative movement toward each other of the heel support and toe rest.

29. A shoe supporting jack having, in combination, a jack frame, a toe rest on the frame, a heel support mounted on the frame to move toward and from the toe rest, means for yieldingly moving the heel support toward the toe rest to locate a shoe on the jack, a stop device for arresting the relative movement of the heel support and toe rest toward each other, and means for preventing the actuation of the stop device prior to the initiation of the movement of the heel support toward the toe rest comprising a cam on the heel support, and connections between the cam and the stop device.

30. A shoe supporting jack having, in combination, a jack frame having a toe rest, a heel supporting arm movable toward and from the toe rest, mechanism including a spring for adjusting the position of the heel supporting arm with respect to the toe rest, an arm pivoted on the jack frame for separating the heel supporting arm from the toe rest against the action of the spring, toggle links connecting said pivoted arm and the heel supporting arm, arranged to be aligned for holding the heel supporting arm away from the toe rest, and toggle breaking means actuated by contact with the shoe as it is placed on the heel supporting arm comprising a sliding member, a dog pivoted to said member, a tripping member normally aligned with the dog, and means for swinging the dog out of alignment with the tripping member after actuation thereof and for returning the dog to aligned position after removal of the shoe from the jack.

31. A shoe supporting jack having, in combination, a jack frame, a heel support and a toe rest on the jack frame relatively movable toward and from each other, means for relatively moving the heel support and toe rest to locate a shoe on the jack, a toggle having one of its links connected to one of said parts, a lever connected to the other link of the toggle, means for actuating the lever while the toggle is straight to separate the heel support and toe rest, and means for breaking the toggle upon placing a shoe upon the jack comprising a toggle tripping lever mounted on one of the toggle links and movable with relation thereto, and connections for actuating said lever upon placing a shoe upon the jack.

32. A shoe supporting jack having, in combination, a frame, a toe rest mounted on the frame, a heel supporting arm pivotally mounted on the frame to swing toward the toe rest to locate a shoe longitudinally on the jack, manually operable means for moving the arm downwardly after the shoe has been thus located on the jack, to unclamp the shoe between the heel support and the toe rest, a toggle having one of its links pivotally connected to the heel supporting arm, a lever connected to the other link of the toggle, means for actuating the lever while the toggle is straight to move the heel supporting arm away from the toe rest, and means for breaking the toggle upon placing a shoe upon the jack comprising a toggle tripping lever mounted on one of the toggle links, a member movably mounted on the heel supporting arm provided with a surface concentric with the pivotal connection between the toggle link and the heel supporting arm engaging the tripping lever, and connections for actuating said member upon placing a shoe upon the jack.

33. A shoe supporting jack having, in combination, a jack frame having a toe rest and a heel supporting arm movable relatively to the toe rest, a lever pivoted on the arm, a last pin carried by the lever, normally idle mechanism acting when thrown into operation to adjust the position of the heel supporting arm with respect to the toe rest, a tripping member for setting the adjusting mechanism in motion, a sliding member on said lever arranged to be operated by contact with the shoe as it is positioned on the last pin, a dog pivoted to the sliding member normally in alignment with the tripping member prior to the operation of said adjusting mechanism, and means for swinging the dog out of alignment with the tripping member after actuation thereof and for returning the dog to aligned position after removal of the shoe from the last pin.

34. A shoe supporting jack having, in combination, a jack frame, a toe rest on the frame, a heel supporting arm fulcrumed on the frame for movement toward and away from the toe rest, mechanism including a spring for adjusting the position of the heel supporting arm with respect to the toe rest, locking and clamping devices for securing the shoe in adjusted position, a retracting arm rotatable on the jack frame for returning the parts to initial positions against the action of the spring, a gear segment for actuating the retracting arm, a lost motion connection between the gear segment and the arm to permit the gear segment to move independently of the arm, and means connected to the gear segment and operable during the period of independent movement thereof for locking said locking devices.

35. A shoe supporting jack having, in combination, a rotatable jack frame, a toe rest and a heel supporting arm mounted thereon, mechanism including a spring for adjusting the position of the heel supporting arm with respect to the toe rest, locking and clamping devices for securing the shoe in adjusted position, a lever pivoted on the jack frame for separating the heel supporting arm and the toe rest, toggle links connecting said lever and the heel supporting arm, arranged to be aligned for holding the heel supporting arm in position against the action of the spring, means for breaking the alignment of the toggle links to allow the spring to act, gearing operating during the turning movement imparted to the jack in an operation on the shoe to swing said lever in one direction and thereby align the toggle links, a lost motion connection between the gearing and the lever to permit the gearing to move independently of the toggle links after the links are aligned, and means connected to said gearing operable during the period of independent movement thereof while a turning movement is being imparted to the jack in restoring the same to starting position for unlocking said locking devices so that the shoe will be unclamped before the gearing actuates the lever from the position assumed when the toggle links are aligned.

36. A shoe supporting jack having, in combination, a rotatable jack frame, a heel support and a toe rest on the jack frame relatively movable toward and from each other, means for relatively moving the heel support and toe rest toward each other to locate a shoe on the jack, a toggle connected to one of said parts, connections actuated by the forward rotation of the jack after the shoe has been located on the jack to straighten the toggle and actuated by the reverse rotation of the jack to move the toggle bodily when straight to separate the heel support and toe rest, and means for disconnecting the toggle from said connections upon rotation of the jack in reverse direction while the toggle is straight.

37. A shoe supporting jack having, in combination, a rotatable jack frame, a heel support and a toe rest on the jack frame relatively movable toward and from each other, means for relatively moving the heel support and toe rest toward each other to locate a shoe on the jack, a toggle having one of its links connected to one of said parts, a lever connected to the other link of the toggle, connections actuated by the forward rotation of the jack after the shoe has been located on the jack to swing the lever in a direction to straighten the toggle and actuated by the reverse rotation of the jack to swing the lever in the opposite direction to move the toggle bodily when straight to separate the heel support and toe rest, and means for disconnecting the lever from said connections upon rotation of the jack in reverse direction while the toggle is straight.

38. A shoe supporting jack having, in combination, a rotatable jack frame, a heel support and a toe rest on the jack frame relatively movable toward and from each other, means for relatively moving the heel support and toe rest toward each other to locate a shoe on the jack, a toggle having one of its links connected to one of said parts, a lever connected to the other link of the toggle pivotally mounted on the jack frame, a gear segment mounted concentric with the pivot of the lever, a non-rotatable pinion engaged by the segment, said gear segment and lever being arranged to straighten the toggle during the forward rotation of the jack after the shoe has been located on the jack and to move the toggle bodily when straight to separate the heel support and toe rest during the reverse rotation of the jack, and means for disconnecting the gear segment and lever to allow independent movement of the gear segment upon rotation of the jack in reverse direction while the toggle is straight.

39. A shoe supporting jack having, in combination, a jack frame, a toe rest and a heel support on the frame relatively movable toward each other to locate a shoe longitudinally on the jack, members for engaging opposite sides of the toe portion of the shoe to locate the toe portion of the shoe laterally on the jack, a jacking lever and connections acting when operated by the jacking lever first to move said members into engagement with the shoe and thereafter to clamp the shoe in position on the jack.

40. A shoe supporting jack having, in combination, a jack frame, a toe rest on the frame, a heel support mounted on the frame to move toward the toe rest to locate a shoe longitudinally on the jack, members for engaging opposite sides of the toe portion of a shoe to locate the toe portion of the shoe laterally on the jack, a jacking lever and connections acting when operated by the jacking lever first to move said members into engagement with the shoe and thereafter to actuate the heel support to clamp the shoe on the jack.

41. A shoe supporting jack having, in combination, a heel support and a toe rest relatively movable toward and from each other, means for relatively moving the heel support and toe rest yieldingly toward each other to locate a shoe longitudinally on the jack, means for thereafter locking the heel support and toe rest against movement away from each other, members for engaging opposite sides of the toe portion of the shoe to locate the toe portion of the shoe laterally on the jack, means for locking said members in engagement with the shoe, and means acting when operated to unlock said members and the heel support and toe rest and to move the heel support and toe rest relatively away from each other.

42. A shoe supporting jack having, in combination, a heel support and a toe rest relatively movable toward each other to locate a shoe longitudinally on the jack, members for engaging the opposite sides of the toe portion of the shoe to locate the toe portion of the shoe laterally on the jack, means for locking said members in engagement with the shoe, and means for forcing the shoe against the toe rest to clamp the shoe on the jack.

43. A shoe supporting jack having, in combination, a heel support and a toe rest relatively movable toward and from each other, means for relatively moving the heel support and toe rest toward each other to locate a shoe longitudinally on the jack, members for engaging the opposite sides of the toe portion of the shoe to lock the toe portion of the shoe laterally on the jack, means for locking said members in engagement with the shoe, and means acting, when operated, to unlock said members and to move the heel support and toe rest relatively away from each other.

44. A shoe supporting jack having, in combination, a heel support and a toe rest relatively movable toward and from each other, means for relatively moving the heel support and toe rest toward each other to locate a shoe longitudinally on the jack, members for engaging the opposite sides of the toe portion of the shoe to locate the toe portion of the shoe laterally on the jack, said members being positively connected to move simultaneously towards and from each other and one of said members being provided with ratchet teeth, a detent to engage said ratchet teeth and lock said members against movement away from each other, and means operated by the shoe as it is moved to adjusted position on the jack for causing the detent to engage the ratchet teeth.

45. A shoe supporting jack having, in combination, a heel support and a toe rest relatively movable toward and from each other, said parts being arranged for relative movement toward each other to locate a shoe longitudinally on the jack, members for engaging the opposite sides of the toe portion of the shoe to locate the toe portion of the shoe laterally on the jack, and manually operable means for moving the said members into engagement with the shoe and for relatively moving the heel support and toe rest to clamp the shoe on the jack.

46. A shoe supporting jack having, in combination, a heel support and a toe rest relatively movable toward and from each other, said parts being arranged for relative movement toward each other to locate a shoe longitudinally on the jack, members for engaging the opposite sides of the toe portion of the shoe to locate the toe portion of the shoe laterally on the jack, and means for locking said members in engagement with the shoe and for relatively actuating the heel support and toe rest to clamp the shoe on the jack.

47. A shoe supporting jack for supporting a lasted shoe with its sole uppermost having, in combination, a heel support and a toe rest relatively movable toward each other to locate a shoe longitudinally on the jack, and members mounted to move downwardly toward each other and connected for simultaneous movement for engaging the opposite sides of the toe portion of the shoe to locate the toe portion of the shoe laterally on the jack.

48. A shoe supporting jack for supporting a lasted shoe with its sole uppermost having, in combination, a heel support and a toe rest relatively movable toward each other to locate a shoe longitudinally on the jack, and members for engaging the opposite sides of the toe portion of the shoe to locate the toe portion of the shoe laterally on the jack, said members being mounted for swivelling movement about substantially perpendicular axes and being connected for simultaneous movement toward and from each other.

49. A shoe supporting jack having, in combination, a heel support and a toe rest relatively movable toward and from each other, means for relatively moving the heel support and toe rest yieldingly toward each other to locate a shoe on the jack, a stop device controlled by the shoe for arresting the relative movement of the heel support and toe rest toward each other, and locking means for holding said device out of operation actuated to permit an actuation of said stop device only after the initiation of the relative movement toward each other of the heel support and toe rest.

50. A shoe supporting jack having, in combination, a heel support and toe rest relatively movable toward and from each other, means for relatively moving the heel support and toe rest yieldingly toward each other to locate a shoe on the jack, and a stop device operable only after initiation of the relative movement toward each other of the heel support and toe rest and controlled by the shoe for arresting the relative movement of the heel support and toe rest toward each other.

51. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, and connections between said locking device and the heel support to lock said support against tilting movement and said arm against swinging movement respectively away from the toe rest to lock the shoe toe longitudinally and downwardly in engagement with the toe rest.

52. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said support against tilting movement and said arm against swinging movement respectively away from the toe rest to lock the shoe toe longitudinally and downwardly in engagement with the toe rest, and manually operable means for thereafter tightening said locking connections to clamp the shoe on the jack.

53. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said support against tilting movement and said arm against swinging movement respectively away from the toe rest to lock the shoe toe longitudinally and downwardly in engagement with the toe rest, and means controlled by the location of the toe portion of the shoe longitudinally and the toe rest to actuate said locking device.

54. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said support against tilting movement and said arm against swinging movement respectively away from the toe rest to lock the shoe toe longitudinally and downwardly in engagement with the toe rest, means controlled by the location of the toe portion of the shoe longitudinally and the toe rest to actuate said locking device, and manually operable means for thereafter tightening said locking connections to clamp the shoe on the jack.

55. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said heel support against tilting movement and said arm against swinging movement respectively away from the toe rest to lock the shoe toe longitudinally and downwardly in engagement with the toe rest, and a locking device to prevent movement of the arm toward the toe rest.

56. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said support against tilting movement and said arm against swinging movement respectively away from the toe rest to lock the shoe toe longitudinally and downwardly in engagement with the toe rest, a locking device to prevent movement of the frame toward the toe rest, and manually operable means for thereafter tightening said locking connections to clamp the shoe on the jack.

57. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said support against tilting movement and said arm against swinging movement respectively away from the toe rest to lock the shoe toe longitudinally and downwardly in engagement with the toe rest, a locking device to prevent movement of the arm toward the toe rest, and means for engaging said locking devices to locate a shoe longitudinally on the jack.

58. A shoe supporting jack having, in combination, a jack frame, a toe rest on the jack frame, a heel support carrying arm pivoted on the frame to swing toward the toe rest to locate a shoe longitudinally on the jack and to swing away from the toe rest, a heel support pivoted on the arm to tilt the shoe, a locking device mounted on said frame, connections between said locking device and the heel support to lock said support against tilting movement and said arm against swinging movement respectively away from the toe rest to lock the shoe toe longitudinally and downwardly in engagement with the toe rest, a locking device to prevent movement of the arm toward the toe rest, means for engaging said locking devices to locate a shoe longitudinally on the jack, and manually operable means for tightening said locking connections to clamp the shoe on the jack.

59. A shoe supporting jack having, in combination, a heel support and a toe rest relatively movable toward each other to locate a shoe longitudinally on the jack, a locking device for stopping the relative movement of the heel support and toe rest toward each other, a locking device for locking the heel support and toe rest against movement from each other, and a device engaged by the shoe for actuating both of said locks upon the location of the shoe longitudinally on the jack.

60. A shoe supporting jack having, in combination, a heel support and a toe rest relatively movable toward each other to locate a shoe longitudinally on the jack, a locking device for stopping the relative movement of the heel support and toe rest toward each other, a locking device for locking the heel support and toe rest against movement from each other, a device engaged by the shoe for actuating both of said locks upon the location of the shoe longitudinally on the jack, and manually operable means for thereafter relatively moving the heel support and toe rest to clamp the shoe on the jack.

61. A shoe supporting jack having, in combination, a jack frame, a toe rest mounted on the frame, heel supporting devices including an arm pivotally mounted on the frame to swing toward and from the toe rest to locate a shoe longitudinally on the jack, locking means for positively locking said devices from movement away from the toe rest, a feeler member, and connections actuated by contact of said member with the shoe toe to engage said lock.

62. A shoe supporting jack having, in combination, a jack frame, a toe rest mounted on the frame, heel supporting devices including an arm pivotally mounted on the frame to swing toward and from the toe rest to locate a shoe longitudinally on the jack, locking means for positively locking said devices from movement away from the toe rest, a feeler member, and connections actuated by contact of said member with the shoe toe to engage said lock, and manually operable means for thereafter actuating said devices to move the toe downwardly against the toe rest to clamp the shoe on the jack.

63. A shoe supporting jack having, in combination, a heel support and a toe rest relatively movable toward and away from each other, said parts being arranged for relative movement toward each other to locate a shoe on the jack, a locking device for locking the heel support and toe rest against movement away from each other after the shoe has been thus located on the jack, and manually operable means for actuating the locking device to release the heel support and toe rest to permit them to be moved relatively away from each other.

64. A shoe supporting jack having, in combination, a heel support and a toe rest relatively movable toward and away from each other, said parts being arranged for relative movement toward each other to locate a shoe on the jack, a locking device for locking the heel support and toe rest against movement away from each other after the shoe has been thus located on the jack, means for moving the locking device to inoperative position, and a latch for retaining the locking device in inoperative position during the movement of the heel support and toe rest away from each other.

65. A shoe supporting jack having, in combination, a jack frame, a toe rest on the jack frame, an arm pivoted on the frame to swing toward and away from the toe rest, a lever pivotally mounted on the arm, a last pin carried by the lever, a second lever also pivoted on the arm, means connecting said levers for rotation in opposite directions, a slide pivoted at one end to the latter lever and guided at the other end in the jack frame, and mechanism for locking the slide to prevent separation of the last pin from the toe rest.

66. A shoe supporting jack having, in combination, a jack frame, a toe rest on the jack frame, an arm pivoted on the frame to swing toward and away from the toe rest, a lever pivotally mounted on the arm, a last pin carried by the lever, a second lever also pivoted on the arm, means connecting said levers for rotation in opposite directions, a slide pivoted at one end to the latter lever and guided at the other end in the jack frame, mechanism for locking the slide to prevent separation of the last pin from the toe rest, a second slide pivoted at one end to the arm and guided at the other end in the jack frame, and means for locking said second slide to prevent movement of the heel supporting arm toward the toe rest.

67. A shoe supporting jack having, in combination, a jack frame, a toe rest on the jack frame, an arm pivoted on the frame to swing toward and away from the toe rest, a lever pivotally mounted on the arm, a last pin carried by the lever, a second lever also pivoted on the arm, means connecting said levers for rotation in opposite directions, a slide pivoted at one end to the latter lever and guided at the other end in the jack frame, mechanism for locking the slide to prevent separation of the last pin from the toe rest, a second slide pivoted at one end to the arm and guided at the other end in the jack frame, means for locking said second slide to prevent movement of the heel supporting arm toward the toe rest, and manually operable means for tightening said slide lock connections to clamp the shoe in the jack.

68. A shoe supporting jack having, in combination, a heel support and a toe rest relatively movable toward and from each other, said parts being arranged for relative movement toward each other to locate a shoe longitudinally on the jack, a feeler arranged to be engaged by the toe of the shoe, means controlled by the feeler for stopping the relative movement of the heel support and toe rest, and means for adjusting the height of the feeler above the toe rest for operation with shoes of different sizes.

GARRETT P. S. CROSS.